(12) United States Patent
Walters

(10) Patent No.: US 11,176,722 B2
(45) Date of Patent: *Nov. 16, 2021

(54) COMPOSING AN ANIMATION SCENE IN A COMPUTER-GENERATED ANIMATION

(71) Applicant: DreamWorks Animation L.L.C., Universal City, CA (US)

(72) Inventor: Brian R. Walters, Burbank, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,961

(22) Filed: Dec. 20, 2019

(65) Prior Publication Data

US 2020/0126281 A1 Apr. 23, 2020

Related U.S. Application Data

(63) Continuation of application No. 15/674,361, filed on Aug. 10, 2017, now Pat. No. 10,529,110.

(Continued)

(51) Int. Cl.
*G06T 13/00* (2011.01)
*G06T 19/00* (2011.01)
(Continued)

(52) U.S. Cl.
CPC .......... *G06T 13/00* (2013.01); *G06T 11/001* (2013.01); *G06T 11/203* (2013.01); *G06T 11/60* (2013.01);
(Continued)

(58) Field of Classification Search
CPC ....... G06T 13/00; G06T 11/001; G06T 11/60; G06T 11/203; G06T 19/00; G06T 13/20;
(Continued)

(56) References Cited

U.S. PATENT DOCUMENTS 10,529,110 B2 * 1/2020 Walters .................. G06T 11/60

OTHER PUBLICATIONS

Emilien et al., "WorldBrush: Interactive Example-Based Synthesis of Procedural Virtual Worlds", ACM Transactions on Graphics, vol. 34, No. 4, Jul. 27, 2015, 12 pages.
(Continued)

*Primary Examiner* — Antonio A Caschera
(74) *Attorney, Agent, or Firm* — Dentons US LLP

(57) ABSTRACT

This disclosure is directed to a method of composing an animation scene in a computer-generated animation. The method includes receiving a user input requesting to perform an operation on at least one computer-generated asset in the animation scene. The method also includes determining, based on the user input, a type of operation and at least one attribute associated with the at least one computer-generated asset in the animation scene. The method further includes, in accordance with the determination of the type of operation and the at least one attribute, processing representations of one or more instances of the at least one computer-generated asset; and projecting the processed representations of the one or more instances of the at least one computer-generated asset onto the animation scene to perform the operation. The method further includes generating metadata associated with the manipulated representations of the one or more instances of the at least one computer-generated asset.

24 Claims, 28 Drawing Sheets
(24 of 28 Drawing Sheet(s) Filed in Color)

Related U.S. Application Data

(60) Provisional application No. 62/374,647, filed on Aug. 12, 2016.

(51) Int. Cl.
    *G06T 11/00*    (2006.01)
    *G06T 11/20*    (2006.01)
    *G06T 11/60*    (2006.01)
    *G06T 13/20*    (2011.01)
    *G06F 3/0484*    (2013.01)

(52) U.S. Cl.
CPC .......... *G06T 19/00* (2013.01); *G06F 3/04845* (2013.01); *G06T 13/20* (2013.01); *G06T 2200/24* (2013.01); *G06T 2219/2016* (2013.01)

(58) Field of Classification Search
CPC ......... G06T 2219/2016; G06T 2200/24; G06F 3/04845
See application file for complete search history.

(56) References Cited

OTHER PUBLICATIONS

Extended European Search Report (includes supplementary European search report and European search opinion) received for European Patent Application No. 17186006.7, dated Jan. 4, 2018, 14 pages.

Final Office Action received for U.S. Appl. No. 15/674,361, dated May 14, 2019, 15 pages.

Grosbelle et al., "Environmental Objects for Authoring Procedural Scenes: Environmental Objects for Authoring Procedural Scenes", Computer Graphics Forum, Oct. 26, 2015, pp. 296-308.

Lipp et al., "Interactive Visual Editing of Grammars for Procedural Architecture", ACM Transactions on Graphics, vol. 27, No. 3, Aug. 1, 2008, p. 102:1-102:10.

Mech et al., "The Deco Framework for Interactive Procedural Modeling", Journal of Computer Graphics Techniques, vol. 1, No. 1, Jan. 1, 2012, pp. 43-99.

Milliez et al., "Hierarchical Motion Brushes for Animation Instancing", Proceedings of the Workshop on Non-Photorealistic Animation and Rendering, NPAR '14, Jan. 2014, pp. 71-79.

Non-Final Office Action received for U.S. Appl. No. 15/674,361, dated Dec. 3, 2018, 14 pages.

Notice of Allowance received for U.S. Appl. No. 15/674,361, dated Aug. 30, 2019, 10 pages.

Takayama et al., "GeoBrush: Interactive Mesh Geometry Cloning", Eurographics, vol. 30, No. 2, Apr. 28, 2011, 10 pages.

Office Action received for European Patent Application No. 17186006.7, dated Jun. 28, 2019, 8 pages.

Office Action received for European Patent Application No. 17186006.7, dated Apr. 6, 2020, 12 pages.

\* cited by examiner

COMPOSING AN ANIMATION SCENE IN A COMPUTER-GENERATED ANIMATION

CROSS-REFERENCE TO RELATED APPLICATIONS

This application is a continuation of U.S. patent application Ser. No. 15/674,361, entitled "COMPOSING AN ANIMATION SCENE IN A COMPUTER-GENERATED ANIMATION", filed Aug. 10, 2017, which claims priority to U.S. Provisional Patent Application Ser. No. 62/374,647, entitled "SPRINKLES", filed Aug. 12, 2016, the content of which are hereby incorporated by reference in their entireties for all purposes.

BACKGROUND

1. Field

This application relates generally to computer-generated animation and, more specifically, to composing a scene in a computer-generated animation.

2. Description of the Related Art

Computer animation is the process of generating scenes using computer graphics. FIG. 1 depicts an example of a computer-generated animation scene. A computer-generated animation scene may include a virtual environment including various objects (e.g., trees, leaves, rocks, clouds, sky, etc.) and characters (e.g., animals, people, etc.). Models of objects and characters, for example, may be created and then moved or deformed to simulate motion. Computer graphics of the computer-generated animation scene are rendered at selected times or frames to create computer-generated animation, such as an animation film.

Current techniques for composing a computer-generated animation scene require intensive operator efforts to manually create each object and character in a scene. Further, editing of the objects and characters may only be performed when the objects and characters are still live, e.g., before they are baked in place. An object or character is baked in place if it is constrained such that its position is fixed in an animation scene. Otherwise, the object or character is live. Therefore, the current techniques for composing an animation scene are inflexible, cumbersome and inconvenient. Existing techniques also do not provide the ability to efficiently generate objects and characters, or flexibly perform operations on the generated objects and characters.

SUMMARY

The following describes techniques for composing an animation scene in a computer-generated animation.

In some embodiments, a computer-generated animation scene in a computer-generated animation is composed by receiving user input. The user input requests to perform an operation on at least one computer-generated asset in the animation scene. Based on the user input, the type of operation and at least one attribute associated with the at least one computer-generated asset in the animation scene are determined. In accordance with the determination of the type of operation and the at least one attribute, representations of one or more instances of the at least one computer-generated asset are processed. The processed representations of the one or more instances of the at least one computer-generated asset are then projected onto the animation scene to perform the operation. Metadata associated with the manipulated representations of the one or more instances of the at least one computer-generated asset is generated. In some embodiments, the metadata can enable re-projecting of the manipulated representations of the one or more instances of the at least one computer-generated asset irrespective of the one or more instances being constrained in place.

In some embodiments, a system for composing an animation scene in a computer-generated animation is provided. The system includes means for receiving a user input requesting to perform an operation of at least one computer-generated asset in the animation scene. The system further includes means for determining, based on the user input, the type of operation and at least one attribute associated with the at least one computer-generated asset in the animation scene. The system further includes, in accordance with the determination of the type of operation and at least one attribute: means for processing representations of one or more instances of the at least one computer-generated asset; and projecting the processed representations of the one or more instances of the at least one computer-generated asset onto the animation scene to perform the operation. The system further include means for generating metadata associated with the representations of the one or more instances of the at least one computer-generated asset. The metadata enables re-projecting of the processed representations of the one or more instances of the at least one computer-generated asset irrespective of the one or more instances being constrained in place.

DESCRIPTION OF THE FIGURES

The patent or application file contains at least one drawing executed in color. Copies of this patent or patent application publication with color drawings will be provided by the Office upon request and payment of the necessary fee.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description sets forth specific configurations, parameters, and the like. It should be recognized, however, that such a description is not intended to limit the present disclosure but is instead provided as a description of exemplary embodiments.

Figure 1:
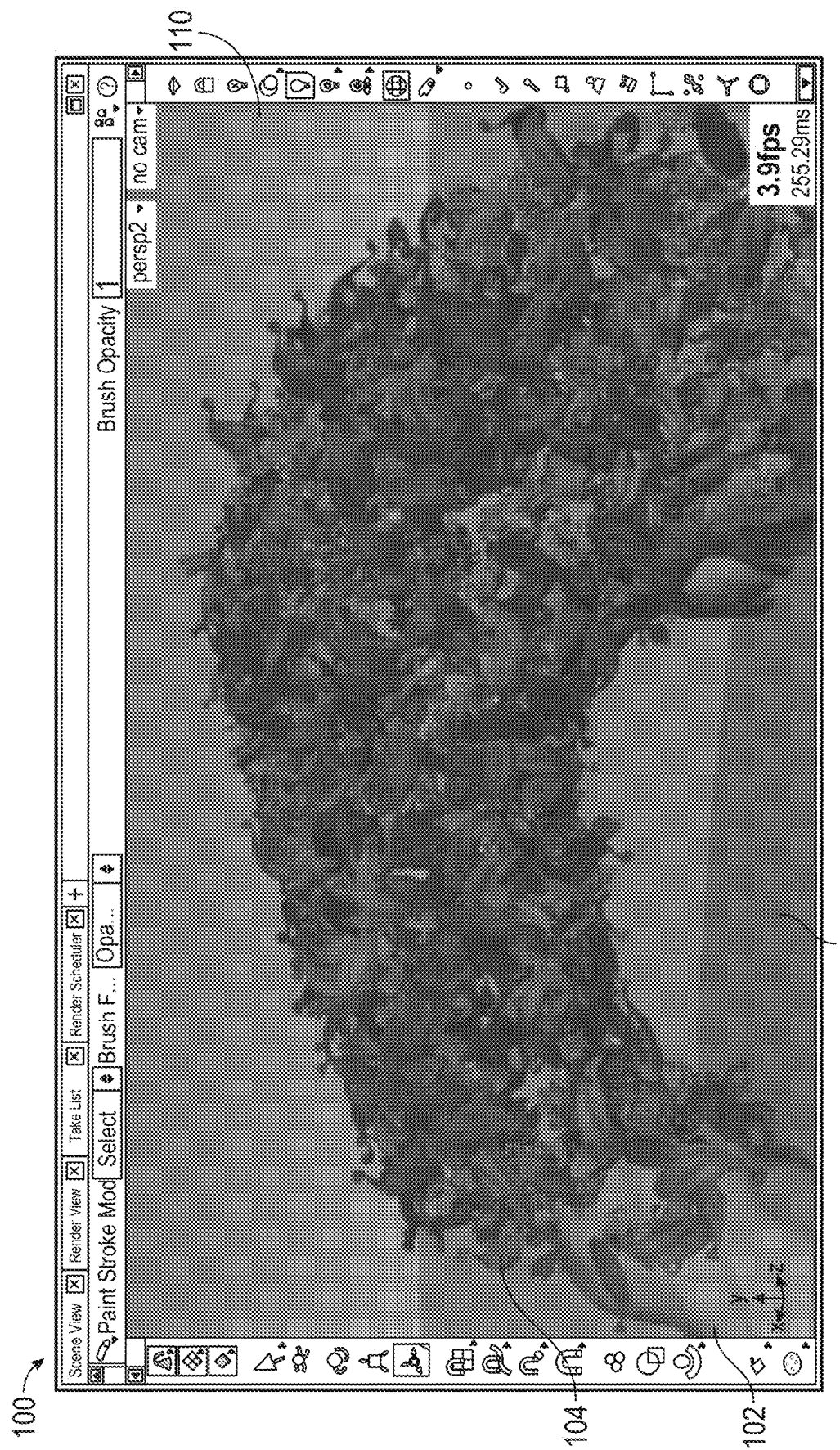
FIG. 1 depicts an exemplary user interface for composing a computer-generated animation scene in accordance with some embodiments.

FIG. 1 depicts an exemplary user interface 100 for composing a computer-generated animation scene 110 in accordance with some embodiments. The animation scene 110 is a computer-generated scene that can include instances of one or more computer-generated assets (e.g., objects 102 and 104) and a background 106. A computer-generated asset can include a polygon, a shape, or computer graphics that represents animated objects (e.g., trees, leafs, rocks, clouds, sky, etc.) or characters (e.g., animals, people, etc.). Assets may also be referred to herein as "toppings"; and instances or representations of instances (e.g., data points) may also be referred to herein as "sprinkles". As shown in FIG. 1, animation scene 110 includes multiple instances of objects 102 and 104. For example, object 102 can be an animated rock; and object 104 can be one or more animated plants. It should be recognized, however, that in some embodiments, animation scene 110 can include, at least in part, instances of other types of assets (e.g., objects or characters).

Figure 2:
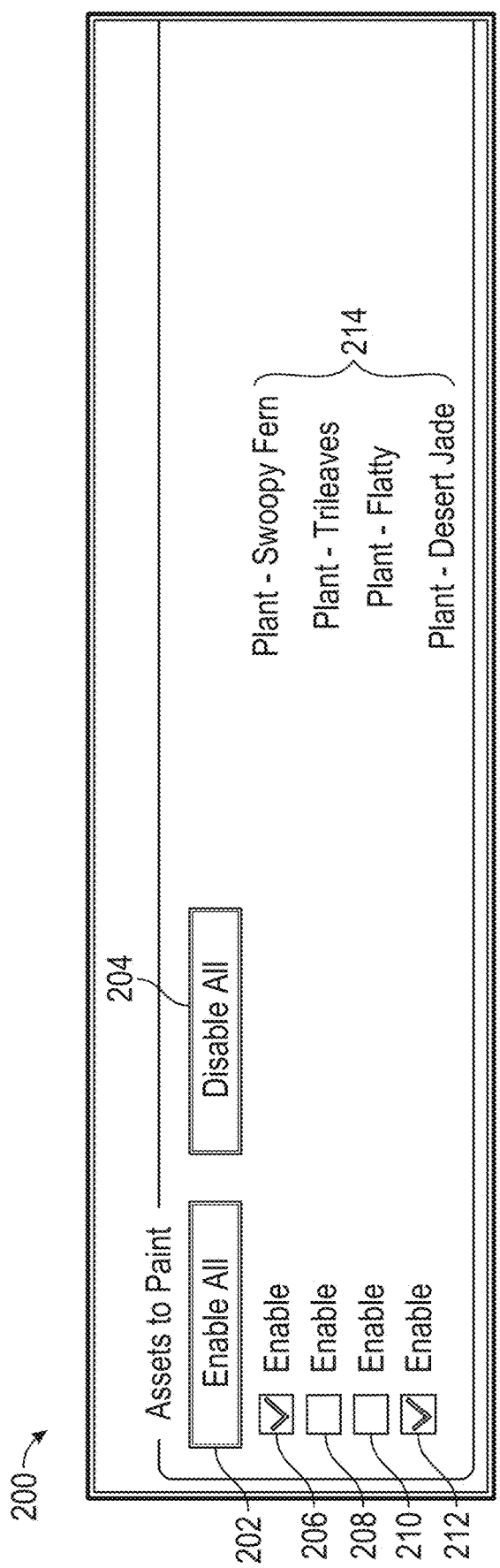
FIG. 2 depicts an exemplary user interface for receiving user input requesting to perform an operation of one or more computer-generated assets in accordance with some embodiments.
Figure 3A:
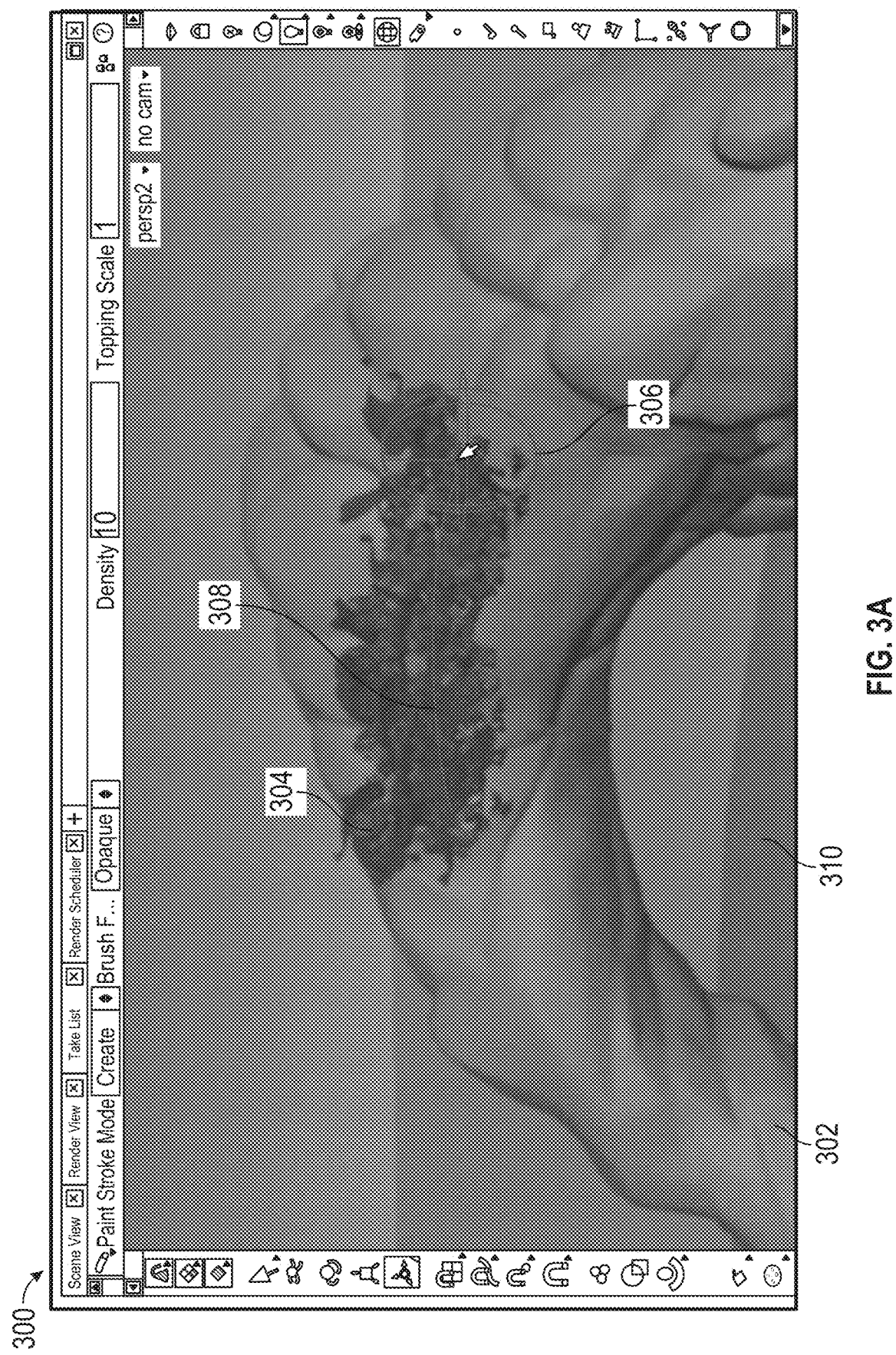
FIG. 3A depicts an exemplary user interface illustrating a paint-stroke based operation for generating instances of a computer-generated asset of an animation scene in accordance with some embodiments.

FIG. 2 depicts an exemplary user interface 200 for receiving user input requesting to perform an operation of one or more computer-generated assets in accordance with some embodiments. FIG. 3A depicts an exemplary user interface 300 illustrating a paint-stroke based operation for generating instances of a computer-generated asset in accordance with some embodiments. With reference to FIGS. 2 and 3A, a user interface (e.g., user interface 200 and 300) can include one or more affordances for composing a computer-generated animation scene. In some embodiments, the user inputs requesting to perform an operation of at least one computer-generated asset can be received via one or more affordances. In some embodiments, the user inputs requesting to perform an operation can be received via a cursor. For example, a request to perform an operation can be provided with respect to a computer-generated animation scene using a cursor. As illustrated in FIG. 2, user interface 200 can provide affordances such as buttons 202 and 204; checkboxes 206, 208, 210, and 212; and a text field 214. As used here, the term "affordance" refers to a user-interactive graphical user interface object that may be displayed on the display screen of an animation program (e.g., system 1500 of FIG. 15). For example, an image (e.g., icon), a button, and text (e.g., link) may each constitute an affordance. As another example, as illustrated in FIG. 3A, user inputs (e.g., paint strokes) can be received using cursor 306. The user interfaces can be provided by an animation program, such as computing system 1500 as described in more details below.

Referring back to FIG. 2, a computer animation program operating on a computer system (referred to herein as "animation program") can receive one or more user inputs for requesting an operation of one or more computer-generated assets via user interface 200. For example, the animation program may receive, via user interface 200, a user's selection of checkboxes 206 and 212 to enable an operation of a first asset (e.g., plant—swoopy fern) and a second asset (e.g., plant—desert jade). It should be recognized, however, that in some embodiments, user interface 200 can include, at least in part, other affordances to enable or disable operations of other assets (e.g., rocks, trees, lakes, rivers, clouds, and characters). In some embodiments, user interface 200 can be displayed in a pop-up window or a sub-interface (e.g., a drop-down menu) of another user interface (e.g., user interface 300). For example, the animation program may display user interface 200 after receiving a user input selecting an icon for operating in paint-stroke mode on user interface 300.

With reference to FIG. 3A, an animation program can also receive one or more user inputs for requesting an operation of one or more computer-generated assets via user interface 300. For example, using one or more affordances (e.g., icons, check boxes, text fields, etc.) displayed on user interface 300, the user can request a paint-stroke based operation of a computer-generated asset. In some examples, the user input requesting to perform an operation can be received by animation scene 310. For example, the animation program can receive one or more paint strokes on animation scene 310 via sphere cursor 306.

Based on the one or more user inputs, the animation program can determine the type of operation and at least one attribute associated with at least one computer-generated asset in an animation scene. With reference to FIG. 3A, for example, based on the user's selection of paint-stroke mode on user interface 300, the animation program can determine that the type of operation to be performed is paint-stroke based operation. In addition to the paint-stroke based operation, the type of operation can include, for example, one or more of an algorithm-based operation, a direct manipulating operation, an animation operation, and a partition operation. A paint-stroke based operation, an algorithm-based operation, an animation operation, and a partition operation can be performed by manipulating underlying representations (e.g., data points stored in a data structure) of instances and projecting the representations to visualize the instances in a computer-generated animation scene, while a direct manipulating operation can be performed directly on geometries of the instances visualized in the animation scene. Each of these types of operations can be performed by the animation program with respect to instances of one or more assets and is described in more detail below.

With reference to FIG. 2, based on the user inputs on user interface 200, the animation program can further determine the computer-generated assets to be used for the requested operation. For example, as shown in FIG. 2, the animation program can determine that two computer-generated assets are to be used for the requested paint-stroke based operation, i.e., the swoopy fern asset and the desert jade asset.

With reference to FIG. 3A, based on the user inputs, the animation program can further determine one or more attributes associated with at least one computer-generated asset. For example, based on the user input using a drop-down menu of user interface 300, the animation program can determine that the computer-generated assets (e.g., swoopy fern plant and desert jade plant) to be used in the requested paint-stroke operation is to have an attribute of being opaque, having a density of 10 and scaling factor of 1, or the like. In some embodiments, attributes associated with a computer-generated asset can include one or more of position, radius, color, density, opacity, strength, texture, ramp, and linearity associated with the computer-generated asset in the animation scene, a type of partition, or the like.

As shown in FIG. 3A, a paint-stroke based operation can be an operation based on one or more paint strokes provided by a user. A paint-stroke based operation can be associated with a radius and optionally a curve extending across at least part of the animation scene. For example, the radius of a paint-stroke based operation can be indicated by a sphere cursor 306 and the curve extending across at least part of animation scene 310 can be indicated by a curve 308 representing the user's movement of the sphere cursor 306. In some embodiments, the user can press and hold sphere cursor 306, and move it along curve 308 to indicate the desired scope of the paint-stroke operation.

In some embodiments, in accordance with the determination of the type of operation (e.g., a paint-stroke based operation) and at least one attribute (e.g., the opaqueness, density, radius, and curve) of at least one computer-generated asset, the animation program can process representations of one or more instances of the at least one computer-generated asset and project the processed representations of the one or more instances of the at least one computer-generated asset onto the animation scene to perform the operation. With reference to FIGS. 2 and 3A-3E, as described above, the user may request to perform a paint-stroke based operation to generate, for example, instances of swoopy fern and desert jade assets on animation scene 310. The animation program determines attributes associated with the swoopy fern and desert jade asset. For example, the animation program may determine that the type of operation is a paint-stroke based operation, that the instances of the swoopy fern and desert jade assets are to be opaque and that the assets have a density of 10, scale of 1, and a radius and curve as indicated by sphere cursor 306 and curve 308, respectively.

In some embodiments, the animation program can further determine variations of one or more attributes that are to-be-applied to the instances of the computer-generated assets when performing a paint-stroke based operation.

FIGS. 3B-3E depict an exemplary user interfaces illustrating the results of paint-stroke based operations for generating instances with different opaqueness variations, density and/or scaling in accordance with some embodiments. As shown in FIGS. 3B-3E one or more affordances 312, 314, 316, 318, and 319 (e.g., drop-menu, text field) can be used to receive user inputs regarding the opaqueness, density, and scaling of the instances, respectively. In some examples, based on received user inputs and/or one or more pre-determined algorithms, the animation program can determine that the paint-stroke fall-off, the opaqueness, the density, and/or the scaling of the instances are to be applied. Some of these attributes may vary according to different positions of the sphere cursor 306 (e.g., more dense or opaque within or at the center of sphere cursor 306 than outside or near the edge of sphere cursor 306). The variations of attributes of the instances (e.g., paint-stroke fall-off) can be linear, non-linear, or customized with a ramp.

Figure 3B:
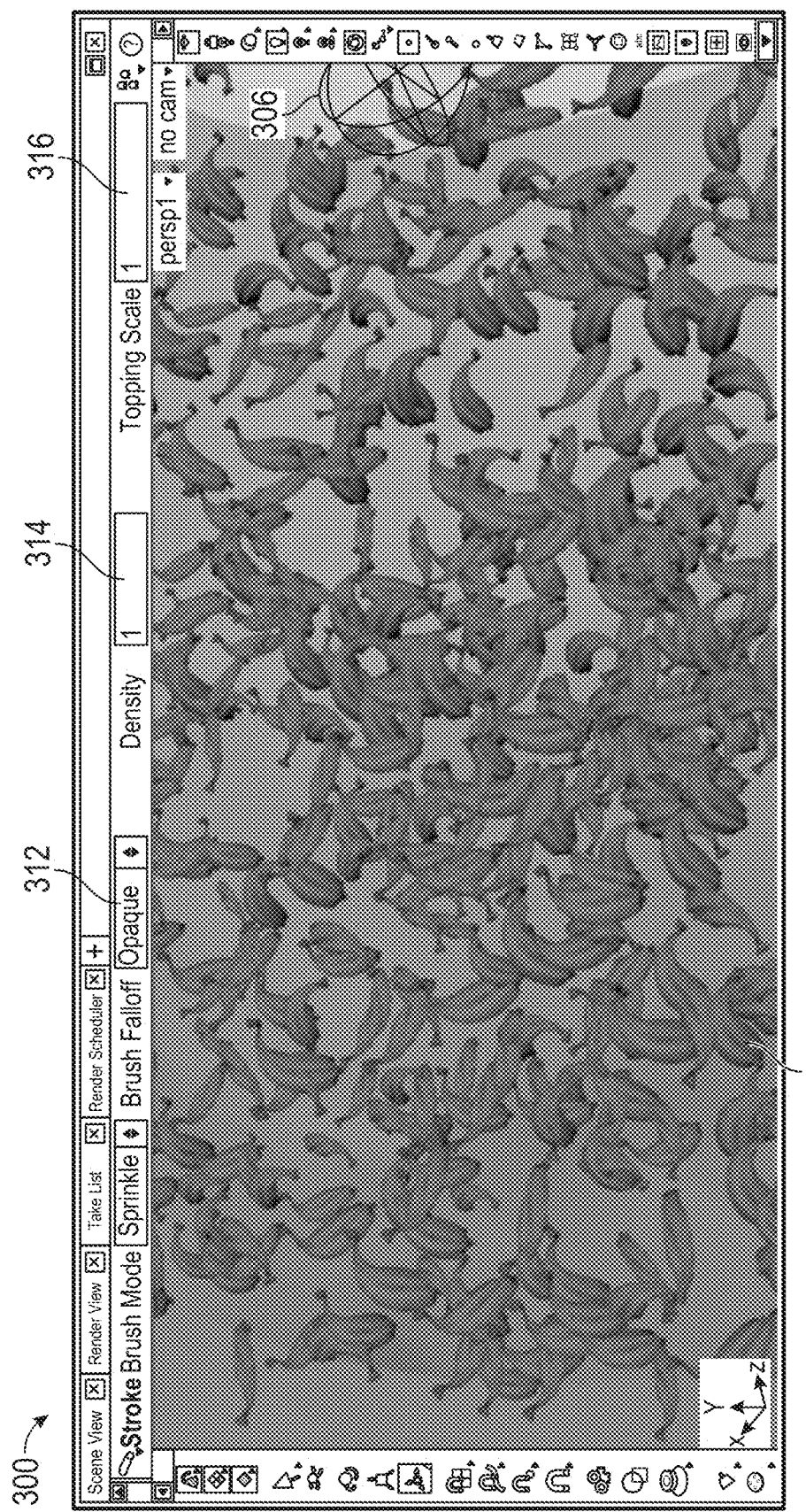
FIGS. 3B-3E depict an exemplary user interfaces illustrating the results of paint-stroke based operations for generating instances with different opaqueness, density and/or scaling in accordance with some embodiments.
Figure 3C:
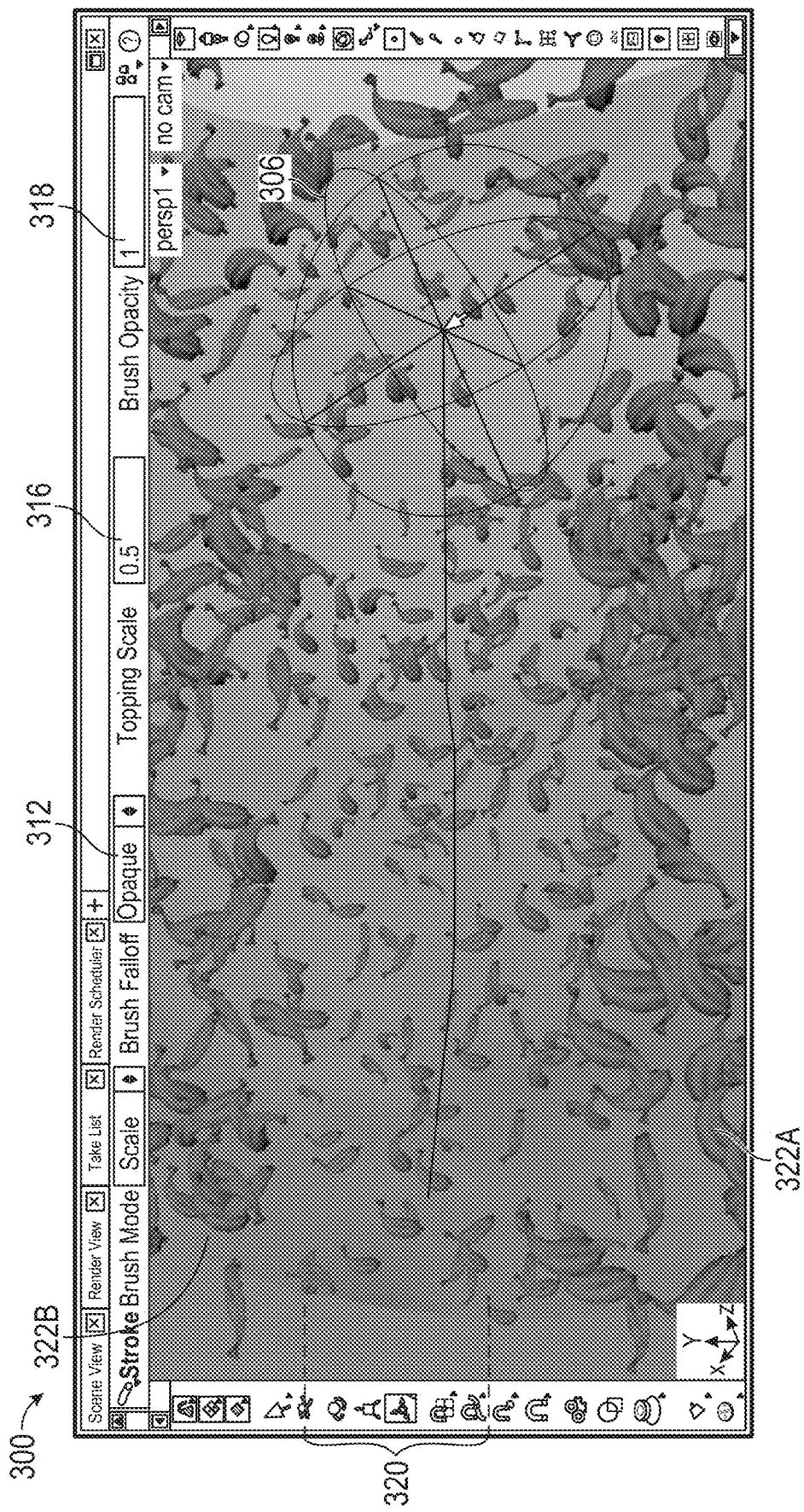
Figure 3D:
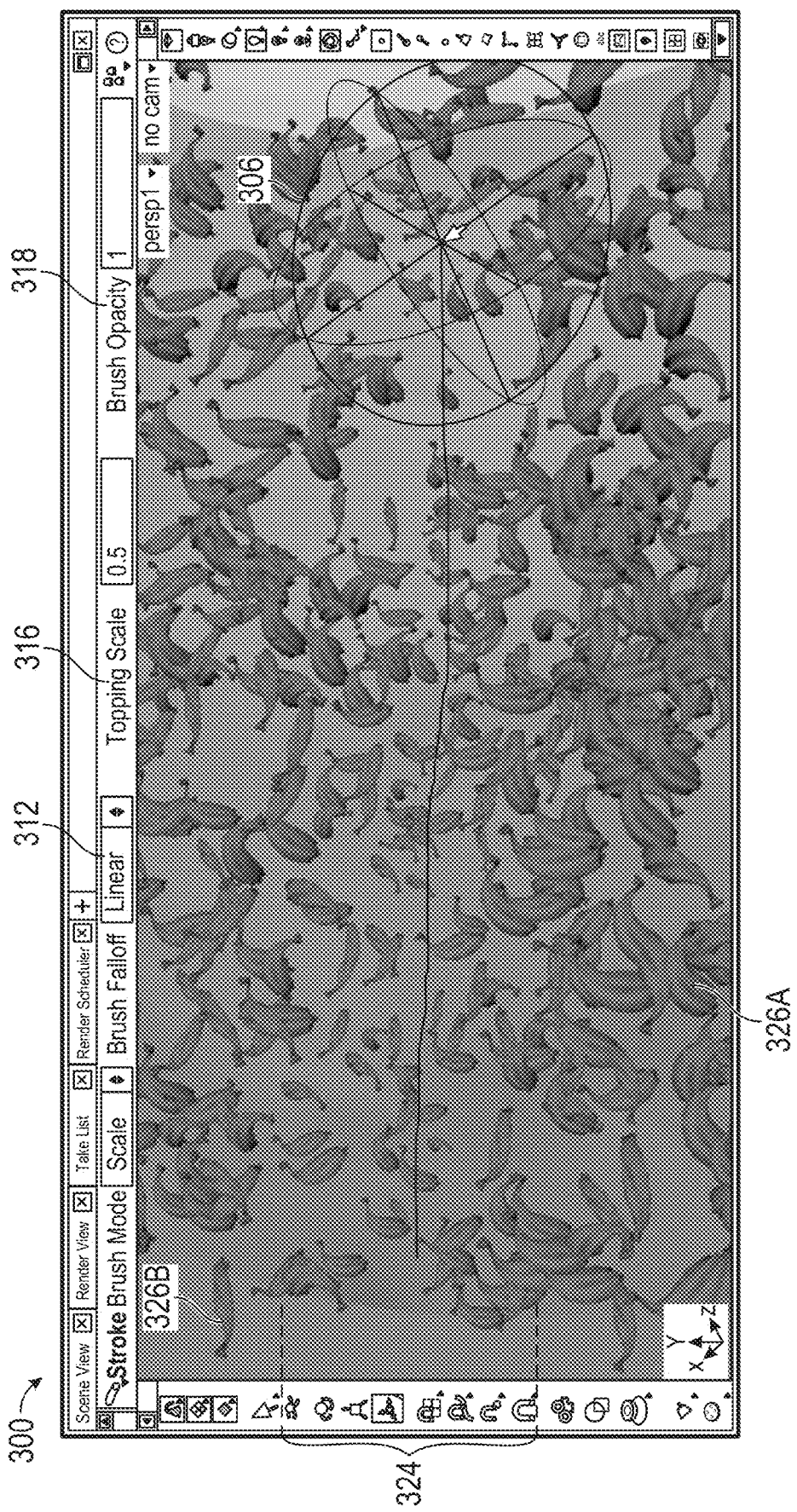
Figure 3E:
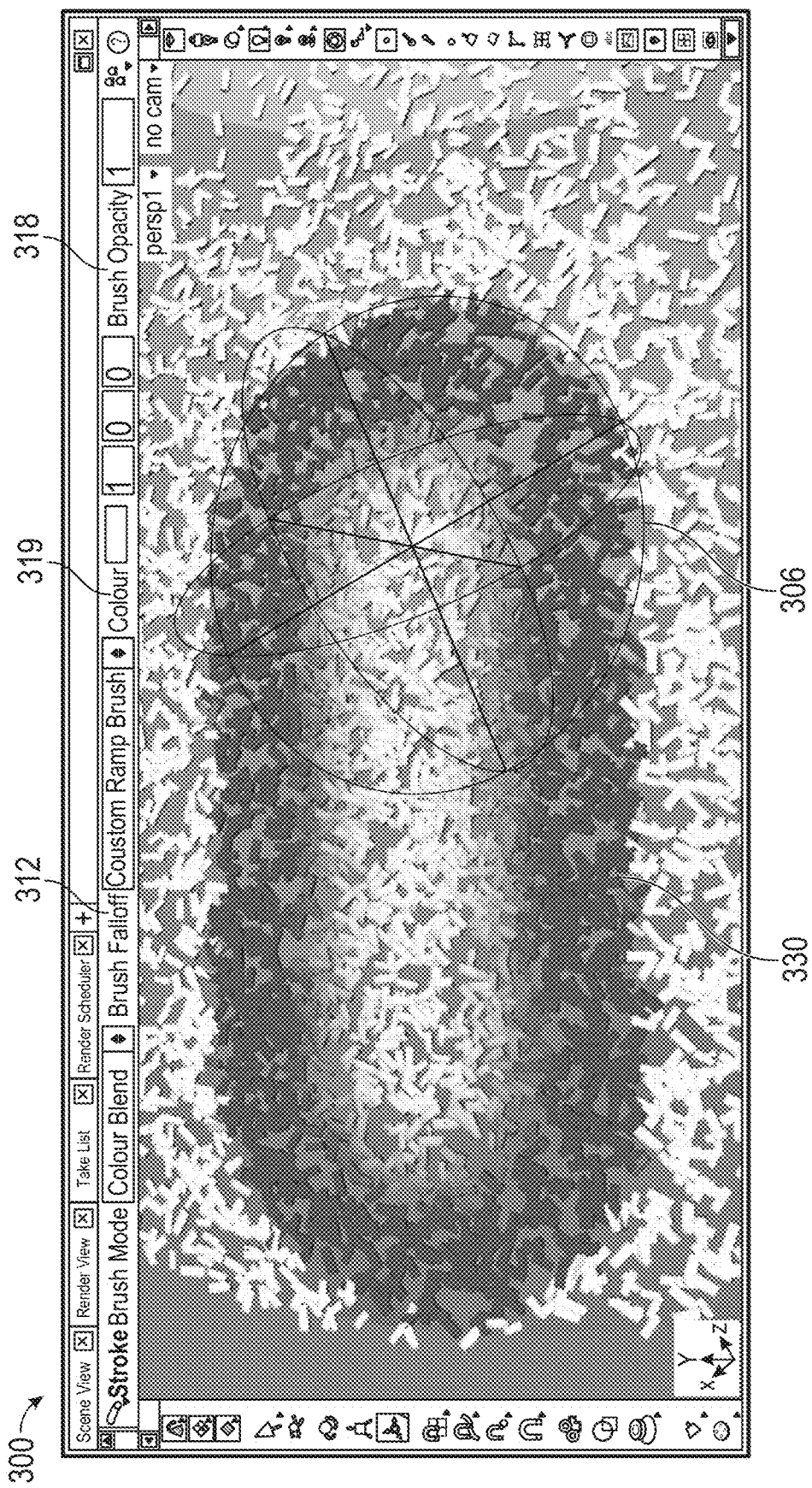

As an example shown in FIG. 3B, based on the user inputs, the animation program can determine that the instances have an opaque paint-stroke fall-off, a density of 1, and no scaling. Thus, instances 310 may appear to have no variation regardless of their positions at the animation scene; may have a constant density; and may have no scaling. As another example shown in FIG. 3C, based on the user inputs, the animation program can determine that an opaque paint-stroke fall-off, a scaling of 0.5, and a paint-stroke opacity of 1 are to be applied to the instances. Thus, instances 322A and 322B, which are positioned near or outside of the edge of sphere cursor 306 may appear to be larger than instances 320 positioned within sphere cursor 306. As another example shown in FIG. 3D, based on the user inputs, the animation program can determine that a linear paint-stroke fall-off and a scaling of 0.5 are to be applied, and the paint-stroke opacity is 1. Thus, similar to FIG. 3C, instances 326A and 326B, which are positioned near or outside of the edge of sphere cursor 306, may appear to be larger than those instances 324 positioned within sphere cursor 306. Moreover, in FIG. 3D, because of the linear paint-stroke fall-off, the transition of attributes (e.g., the scaling) from instances 324 to instances 326A/326B may be linear or more smooth than the transition illustrated in FIG. 3C. As another example shown in FIG. 3E, based on user inputs using affordances 312, 318, and 319, the animation program can determine that a custom paint-stroke fall-off with a specified color scheme (e.g., red near the edge of sphere cursor 306 with white near the center) are to be applied, and the paint-stroke opacity is 1. Thus, instances generated by sphere cursor 306 may appear to be red near the edge of sphere cursor 306 and white near the center. It is appreciated that based on user inputs, the animation program can generate instances with any custom paint-stroke fall-off and any other attributes (e.g., scale, opacity, color).

According to the determination, the animation program processes representations of one or more instances (e.g., instances 304) of the computer-generated assets. In some embodiments, the processing can include selecting one or more computer-generated assets for each instance based on the user input and generating representations for the instances. For example, the animation program can select a percentage of swoopy fern and a percentage of desert jade plants for generating instances 304 (e.g., 50% swoopy fern and 50% desert jade, or any desired percentages), and generate representations of instances 304. The representations of instances 304 can include, for example, data points stored in a data structure (e.g., table, stack, queue, etc.). The data points can represent the instances and can indicate their attributes (e.g., type of asset, density, color, opaqueness, size, position, etc.). In one example as shown in FIG. 3A, based on the user's movement of sphere cursor 306 along curve 308, the animation program can generate a plurality of representations of instances 304 (e.g., instances of swoopy fern and desert jade assets) within or in the vicinity of the radius indicated by sphere cursor 306 and along the area indicated by curve 308.

With reference to FIG. 3A, the animation program can project the generated representations (e.g., data points) of instances 304 onto a computer-generated animation scene. For example, as shown in FIG. 3A, based on the generated data points of instances 304, the animation program can display instances 304 within the radius indicated by sphere cursor 306 along the curve indicated by curve 308 in the animation scene 310. Moreover, in some embodiments, after the representations of the instances are generated and projected onto animation scene 310, the animation program can further generate and store metadata for these instances. The metadata can include log data associated with an operation (e.g., original positions of instances before an operation is performed, the time stamps of the operation that generates the instances, etc.). As described in more detail below, in some embodiments, the metadata can enable re-projecting of the representations of instances regardless of whether the instances are constrained in place (e.g., baked). In some embodiments, the metadata can enable the animation program to move or edit existing instances as a group. For example, the animation program generates and records timestamps of instances 304, which indicate that instances 304 are results of a single paint-stroke operation. The animation program thus allows instances 304 (e.g., multiple instances of swoopy fern and desert jade assets) to be manipulated as a group. For example, as a group, instances 304 can be selected and moved to a different position, copied, and pasted to another animation scene or edited in any desired manner.

While FIG. 3A illustrates a paint-stroke based operation performed by, for example, pressing and holding sphere cursor 306 and moving it along curve 308. It is recognized that other types of paint-stroke based operations can be performed. For example, a paint-stroke based operation can be performed by a single-click operation using a sphere cursor. For example, the animation program may receive user inputs as one or more single clicks via sphere cursor 306. Based on the received user inputs, the animation program can generate an individual representation of an instance for each separate user input and project each individual representation to display the corresponding instance in animation scene 310.

In some examples, based on a single-click operation performed by the user, a cluster of instances can be generated and projected onto the animation scene. For example, the animation program may receive a user input as a single click via sphere cursor 306. Based on the received single click, the animation program can generate representations of a group (e.g., a clump or cluster) of instances positioned within or in the vicinity of the radius of sphere cursor 306. The number of instances within the group can be predetermined or preconfigured. The radius, size, shape, and other attributes of the group of instances can also be predetermined or preconfigured. The animation program can thus project the representations by displaying the group of instances in animation scene 310 at positions indicated by sphere cursor 306. In some embodiments, after the group of instances is displayed in animation scene 310, the animation program can further generate metadata associated with the group of instances. As described above, the metadata can enable re-projecting of the representations of the group of instances irrespective of whether the instances are constrained in place (e.g., baked). In some embodiments, the metadata can enable the animation program to move or edit the group of instances as a whole. For example, based on the metadata, a cluster of instances of swoopy fern and desert jade assets can be selected and moved to a different position, copied, and pasted to another animation scene, or edited in any desired manner, as a group rather than as individual instances.

In some embodiments, based on user request, the animation program can manipulate existing instances of a computer-generated animation scene. For example, such manipulation can include erasing, scaling, altering, color multiplying, color blending, placing attractors, combing, etc. For manipulating existing instances, a user can provide input indicating the desired manipulation via one or more affordances on a user interface. The user can also provide input with respect to a computer-generated animation scene via a cursor. Similar to those described above, based on the user inputs, the animation program can determine the type of operation (e.g., a paint-stroke based operation) and one or more attributes associated with the instances to be used in the operation. For example, the animation program can determine that the operation to be performed is paint-stroke based manipulation such as erasing, scaling, altering, color multiplying, color blending, placing attractors, combing, etc. Some of these operations are described in more detail below.

Figure 4:
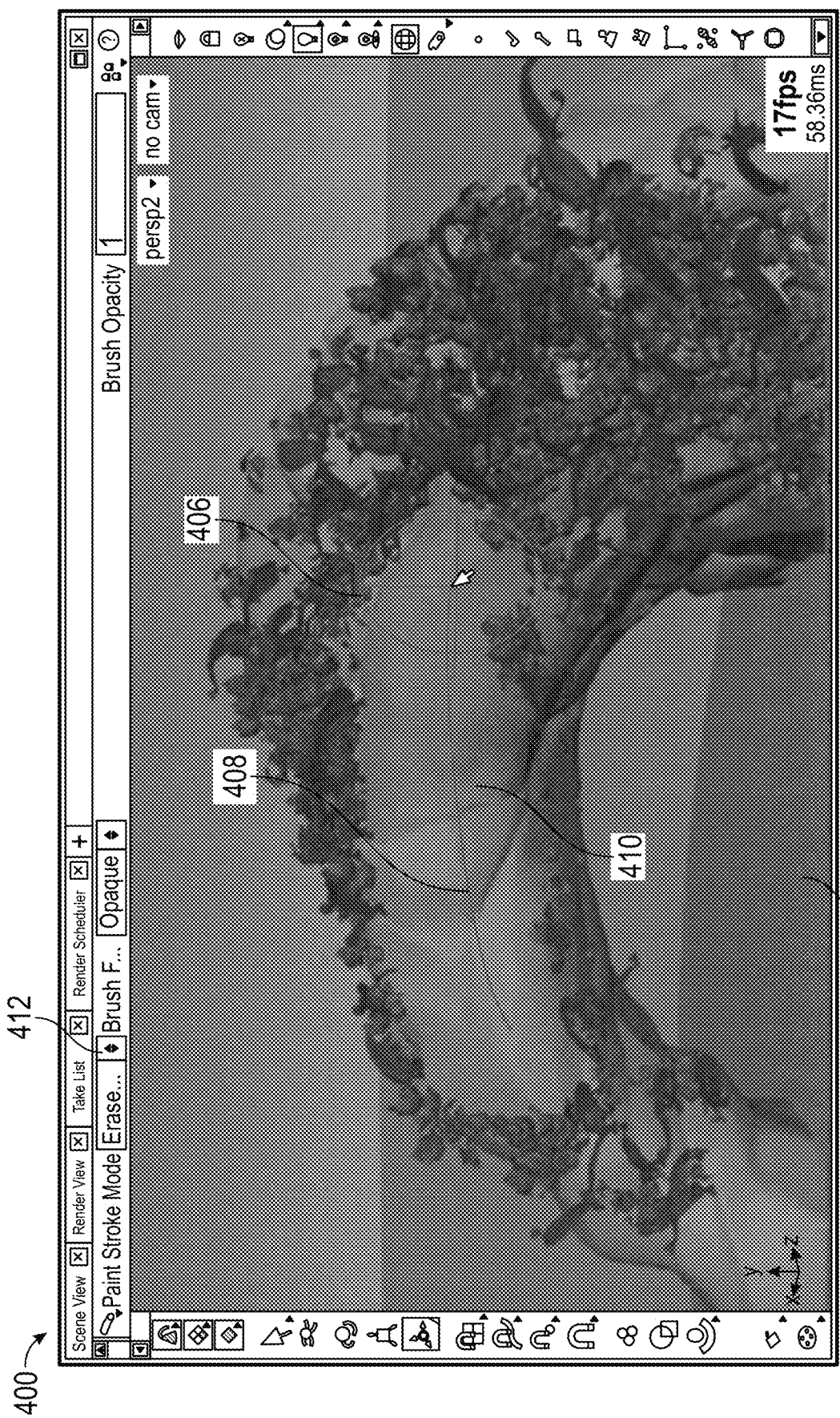
FIG. 4 depicts an exemplary user interface illustrating a paint-stroke based operation for erasing instances of a computer-generated asset of an animation scene in accordance with some embodiments.

FIG. 4 depicts an exemplary user interface 400 illustrating a paint-stroke based operation for erasing instances of a computer-generated asset of an animation scene 420 in accordance with some embodiments. In some embodiments, via a user interface 400, the animation program can receive a user input requesting erasing of existing instances of animation scene 420. For example, using a drop-down menu 412, the animation program can receive the user's selection of an "erase" operation in the paint-stroke mode. The animation program can thus determine that the operation to be performed is a paint-stroke based erasing operation. In some embodiments, the animation program allows the user to use animation scene 420 to provide further inputs for performing the erasing operation. As shown in FIG. 4, the user can press and hold sphere cursor 406 and move it along the curve 408 to indicate the scope of the instances to be erased. The animation program receives such user inputs and determines that the instances of plants within the radius of the sphere cursor 406 along curve 408 are to be erased. Accordingly, the animation program can manipulate the representations (e.g., data points) of the instances. For example, the animation program can designate the representations of the instances positioned approximately within the radius of sphere cursor 406 along curve 408 for erasing. Based on the designated representations, the animation program can erase the corresponding instances from animation scene 420.

In some embodiments, for an erasing operation, the animation program can allow the user to specify the type of asset and/or a percentage of instances to be erased. For example, user interface 400 can include a drop-down menu (not shown) for the user to select one or more particular assets (e.g., swoopy fern) to be erased and a text field for the user to specify the percentage of instances (e.g., all, 10%, etc.) of the selected asset to be erased. Based on the user inputs, the animation program can designate the corresponding instances (e.g., all instances of swoopy fern, 10% instances of swoopy fern, only bushes instances, but not trees instances, etc.) of selected asset for erasing and erase them from the animation scene based on the designation. Accordingly, the animation program can designate the specified instances for erasing and erase them from the animation scene.

Figure 5:
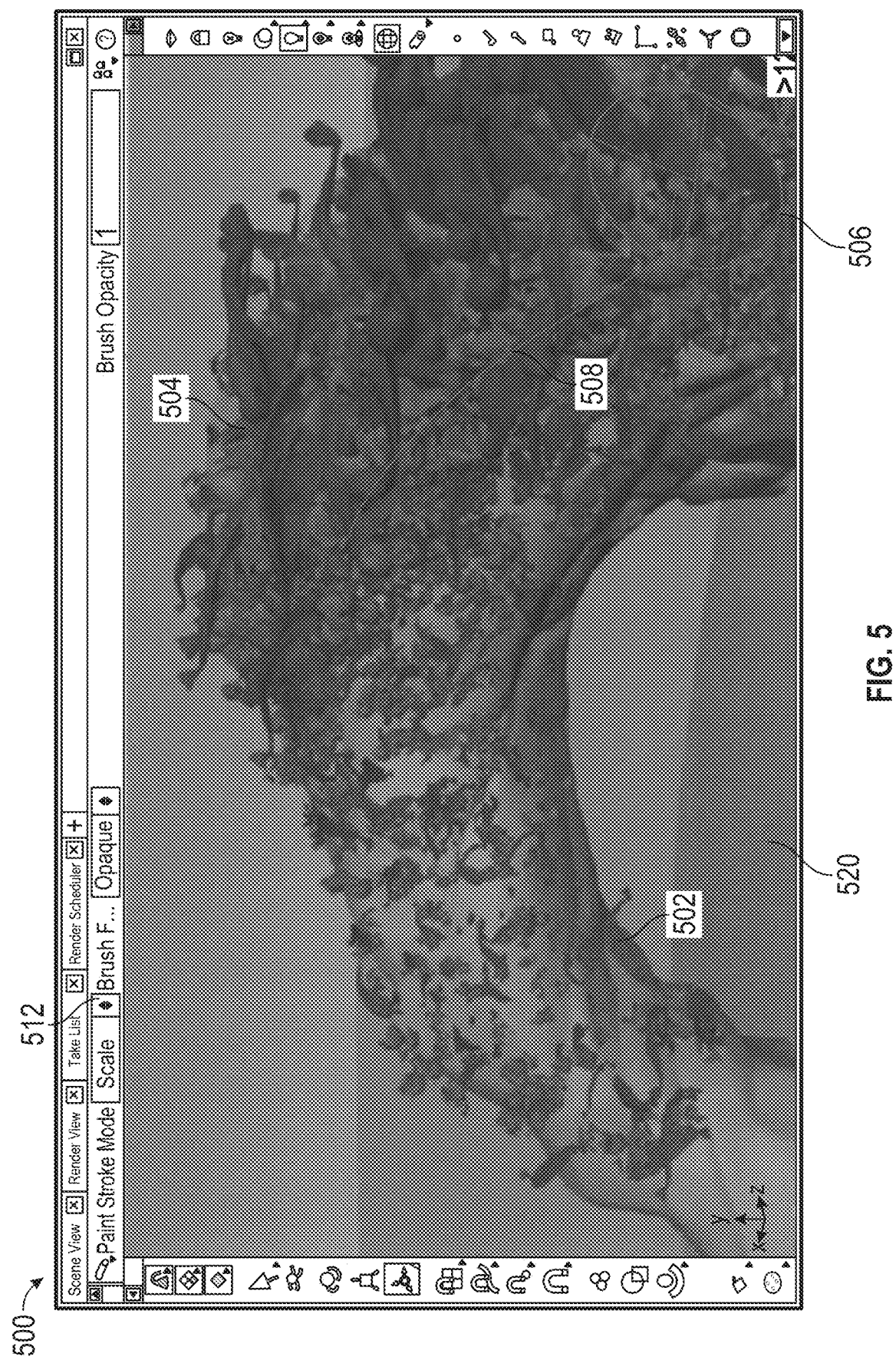
FIG. 5 depicts an exemplary user interface illustrating a paint-stroke based operation for scaling instances of a computer-generated asset of an animation scene in accordance with some embodiments.

FIG. 5 depicts an exemplary user interface 500 illustrating paint-stroke based operation for scaling instances of a computer-generated asset of an animation scene in accordance with some embodiments. In some embodiments, via user interface 500, the animation program can receive a user input requesting scaling of existing instances of animation scene 520. For example, using a drop-down menu 512, the animation program can receive the user's selection of a "scale" operation in the paint-stroke mode. In some examples, the animation program can receive one or more other selections via affordances of user interface 500, such as a scaling factor, a percentage of instances to be scaled, etc. The animation program can thus determine that the operation to be performed is a paint-stroke based scaling operation. In some embodiments, the animation program allows the user to use animation scene 520 to provide further inputs for performing the scaling operation. As shown in FIG. 5, the user can use a sphere cursor 506 and move it along the curve 508 to indicate the scope of the instances to be scaled. The animation program receives such user inputs and determines that the instances positioned approximately within the radius of the sphere cursor 506 along curve 508 are to be scaled. In some examples, based on the user inputs, the animation program can further determine the scaling factor (e.g., increase by a factor of 2) or percentage (e.g., decrease by 50%). Accordingly, the animation program can manipulate the representations (e.g., data points) of the instances to be scaled. For example, the animation program can designate the representations of the instances positioned approximately within the radius of sphere cursor 506 along curve 508 for scaling; and determine representations of the post-scaling instances by calculating the dimensions/positions of the post-scaling instances. The animation program can thus scale the instances designated for scaling based on the representations of post-scaling instances. A scaling operation can increase or decrease one or more dimensions (e.g., length, width, height) of the instances. As shown in FIG. 5, on animation scene, instances 504 are enlarged proportionally in all dimensions compared to unscaled instances 502.

In some embodiments, the animation program can allow the user to specify the percentage of the instances to be scaled and/or a scaling factor or scaling percentage. For example, the animation program can provide a text field for the user to specify the percentage (e.g., 20%) of the instances to be scaled, and a text field for the user to specify the scaling factor (e.g., factor of 2) or scaling percentage (e.g., enlarge by 10%). In some embodiments, user can also specify (e.g., via a similar text field) the percentage of instances with respect to which another operation (e.g., a paint-stroke based operation such as erasing instances, modifying instances, or the like) may be performed. Based on the user inputs, the animation program can designate the specified percentage of the instances of selected asset for scaling and scale them according to the scaling factor/percentage on the animation scene. In some examples, the animation program can select the instances of the specified percentage for scaling based on user's paint-stroke inputs (e.g., user moving sphere cursor 506 along curve 508) or select the instances randomly (e.g., randomly select 20% of the instances on animation scene 520). As another example, the animation program, via user interface 500, can allow the user to select instances of one or more pre-determined assets for scaling (e.g., only bushes instances, but not trees instances). For example, user interface 500 can include a drop-down menu (not shown) for the user to select one or more particular assets (e.g., swoopy fern) to be scaled. Accordingly, the animation program can designate the instances of the selected assets for scaling, determine the representations (data points) of the post-scaling instances, and display the scaled one or more instances based on the representations of post-scaling instances.

Besides erasing and scaling, the animation program can perform other paint-stroke based modification operations. For example, using a drop-down menu (not shown) on user interface 500, the animation program can receive the user's selection of a modification operation, such as replacing, changing attributes, re-randomizing, in the paint-stroke mode. In some examples, the animation program can receive one or more other selections via affordances of user interface 500, such as an asset to be used for the modification operation. The animation program can thus determine that the operation to be performed is a paint-stroke based modification operation. In some embodiments, the animation program allows the user to use a cursor to provide further inputs for performing the operation with respect to an animation scene. For example, the user can use a sphere cursor and move it along a curve to indicate the scope of the instances to be modified. The animation program receives such user inputs and determines that the instances positioned approximately within the radius of the sphere cursor along the curve are to be modified.

In some examples, based on the user inputs, the animation program can further determine attributes associated with the modification operation. For example, the animation program can determine that a new asset is to be used in a replacing operation (e.g., replacing all swoopy fern instances with desert jade instances), or a new attribute (e.g., color, shape, dimension, position, etc.) of one or more instances is to be used to change the appearance of some existing instances. Accordingly, the animation program can manipulate the representations (e.g., data points) of the instances to be modified. For example, the animation program can designate the representations of the instances positioned approximately within the radius of the sphere cursor along the specified curve for modification, and determine representations of post-modification instances (e.g., determine the data points associated with the replacing instances). The animation program can thus perform the requested modification operation on the animation scene.

As described above, a modification operation can include replacing one or more existing instances of one computer-generated asset with one or more instances of another computer-generated asset. For example, on animation scene 520, instances 504 can be replaced with instances of another asset (e.g., bush instances can be replaced with tree instances). A modification operation can also include changing at least one attribute of the instances 504. For example, based on the representations designated for paint-stroke based modification, the animation program can change one or more of color, shape, dimension, position, etc., of instances 504. The modification operation can also include re-randomizing instances 504. As described in more detail below, in an algorithm-based mode, the animation program can use a randomization algorithm to generate instances randomly in an animation scene. In some embodiments, based on the user's paint-stroke inputs, the animation program can re-randomize some or all instances. For example, the animation program may receive user inputs indicating that instances along curve 508 within the radius of sphere cursor 506 are to be re-randomized. Accordingly, the animation program can re-generate representations (data points) of instances 504 randomly based on, for example, a different randomization seed. Based on the re-generated representations, the animation program can display the re-randomized instances 504, which can have a different distribution (e.g., different positions or density of instances) or different attributes (e.g., color, shape, etc.) from those of original instances 504.

Figure 6:
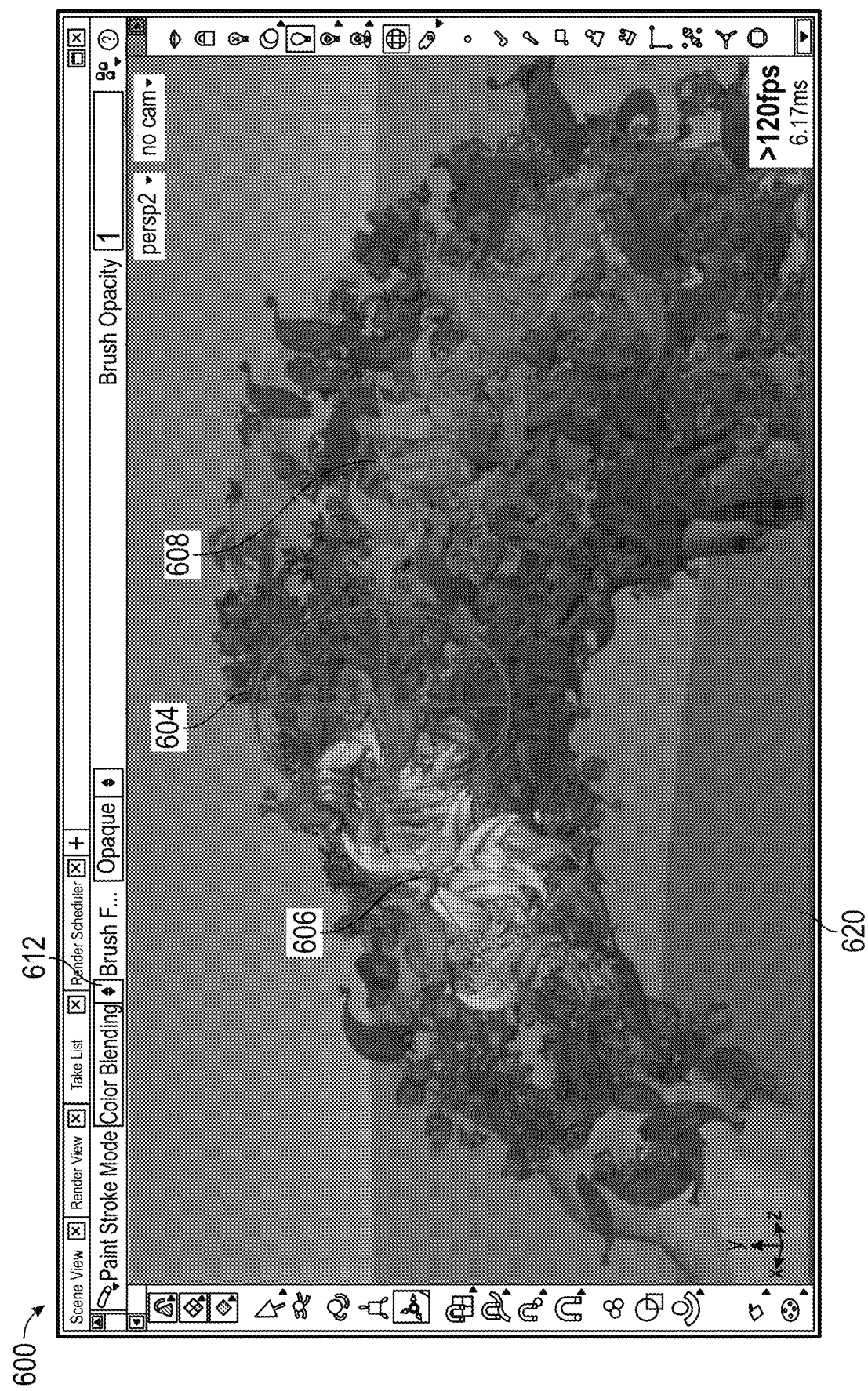
FIG. 6 depicts an exemplary user interface illustrating a paint-stroke based operation for color-blending instances of a computer-generated asset of an animation scene in accordance with some embodiments.

FIG. 6 depicts an exemplary user interface 600 illustrating a paint-stroke based operation for color-blending instances of a computer-generated asset of an animation scene in accordance with some embodiments. Color-blending relates to blending the color of a first layer and the color of a second layer of one or more instances. Color-blending can include, for example, masking or hiding the color of an underlying layer, dissolving, multiplying, screening, overlaying, hard lighting, soft lighting, dodging and burning, dividing, addition, subtracting, differencing, darkening, lightening, etc. As an example, in masking or hiding the color of an underlying layer, the color of the top layer is used for all the instances to be color-blended and the color of the underlying layer is hidden or masked. As another example, in color-multiplying, the animation program can multiply the numbers of each pixel of a top layer with the corresponding pixel of a bottom layer. Thus, for each instance to be color-blended, color-multiplying can enable the color attributes (e.g., RGB vector) of a top layer to be blended or diffused to a color of the bottom layer. In some embodiments, an operation related to color (e.g., color-blending or color multiplying) may vary the color attributes and not other attributes of the instances. For example, attributes of a particular instance may include a red color, certain texture, a brightness level, and other attributes. A color-blending operation applied to the particular instance may vary the red color to, for example, green, without varying the texture, the brightness level, and other attributes of the instance.

In some embodiments, in performing a color-blending operation, the animation program receives one or more user inputs requesting to perform a paint-stroke based color-blending operation of instances displayed on animation scene 620. For example, using a drop-down menu 612 on user interface 600, the animation program can receive the user's selection of a color-blending operation (e.g., color-multiplying, dissolving, screening, overlaying, etc.) in the paint-stroke mode. In some examples, the animation program can receive one or more other selections via affordances of user interface 600, such as an asset to be used for the color-blending operation (e.g., only perform color-blending with respect to instances of swoopy ferns). Based on the user inputs, the animation program can thus determine that the operation to be performed is a paint-stroke based color-blending operation. In some embodiments, the animation program allows the user to use a cursor to provide further inputs for performing the operation with respect to an animation scene. For example, the user can use sphere cursor 604 and move it along a curve to indicate the scope of the instances to be color-blended. The animation program receives such user inputs and determines that the instances positioned approximately within the radius of the sphere cursor 604 along the curve are to be color-blended.

In some examples, based on the user inputs, the animation program can further determine attributes associated with the color-blending operation. For example, the animation program can determine the color attributes (e.g., an RGB vector), brightness, lighting, etc., of one or more instances to be used for color-blending. Accordingly, the animation program can manipulate the representations (e.g., data points) of the instances to be color-blended. The manipulation can include designating representations of the instances for color blending and determining representations of post-color-blending instances. For example, the animation program can designate the representations of the instances 606 and 608 (e.g., instances positioned approximately within the radius of the sphere cursor 604 along the specified curve) for color blending, and determine the representations of post-color-blending instances (e.g., determine the color of the post-color-blending instances 606 and 608). The animation program can thus project the representations of the post-color-blending instances onto animation scene 620 by displaying the color-blended one or more instances. As shown in FIG. 6, on animation scene 620, instances 606 and 608 can be color-blended and the animation program can display the color-blended instances 606 and 608 to have, for example, pink and yellow colors respectively, instead of having the original green color.

While FIGS. 2-6 illustrate some examples of paint-stroke based operation (e.g., generating, erasing, scaling, color-blending), it is recognized that an animation program can be configured to perform any desired paint-stroke based operations. As one example, a paint-stroke based operation can include an operation to generate an attractor on an animation scene. An attractor enables an animation of attracting instances positioned approximately within a pre-determined radius of the attractor to move toward the attractor's position. For example, an attractor can be an attracting point or sphere that is disposed in an animation scene. In a dynamic simulation of an animation, the attractor can attract instances positioned approximately within the radius of center of the attracting sphere to move toward the attractor's position. In some embodiments, in placing an attractor, the animation program can receive, via one or more affordances (e.g., text fields for specifying the operation is an attractor placing operation) of a user interface, user inputs requesting placing of an attractor on the animation scene. In some examples, the animation program can also receive user inputs indicating the strength of the attraction (e.g., higher strength of attraction may cause the instances to move faster toward the attractor's position). The animation program can thus determine that the operation to be performed is a paint-stroke based attractor operation. In some embodiments, the animation program allows the user to use a cursor to provide further inputs for performing the operation with respect to an animation scene. For example, the user can use a sphere cursor with a configurable radius to indicate the position and radius of an attractor point or sphere on the animation scene. In some embodiments, one or more affordances (e.g., text fields) can be used to receive the coordinates of the attractor. Based on the user inputs, the animation program can generate a representation of an attractor having the specified radius. Based on the representation of the attractor, the animation program can provide the attraction sphere on the animation scene. In some embodiments, the animation program can display the attraction sphere on the animation scene such that it is visible. In some embodiments, the attraction sphere may not be displayed or visible.

As another example, a paint-stroke based operation can include a combing operation. A combing operation facilitates a variation of the orientations of instances toward a pre-determined direction. In some embodiments, in a combing operation, the animation program receives one or more user inputs (e.g., via a text field of a user interface) requesting to perform a paint-stroke based combing operation on the animation scene. Based on the user inputs, the animation program can determine that the operation to be performed is a paint-stroke based combing operation. In some embodiments, the animation program allows the user to use a cursor to provide further inputs for performing the combing operation. For example, the user can press, hold, and move a sphere cursor having a configurable radius toward a desired direction, thereby indicating that the instances within the radius of the sphere cursor is to be combed toward the desired direction (e.g., changing the orientations toward to the desired direction). The animation program receives such user inputs, designates the representations of the instances within the specified radius of the sphere cursor for combing, and determines representations of post-combing instances. For example, the representations of post-combing instances can include data indicating the new positions of the instances. Based on the representations of the post-combing instances, the animation program can show orientation variation of the instances (e.g., leaning, facing, twisting, rotating) toward the specified direction.

Figure 7:
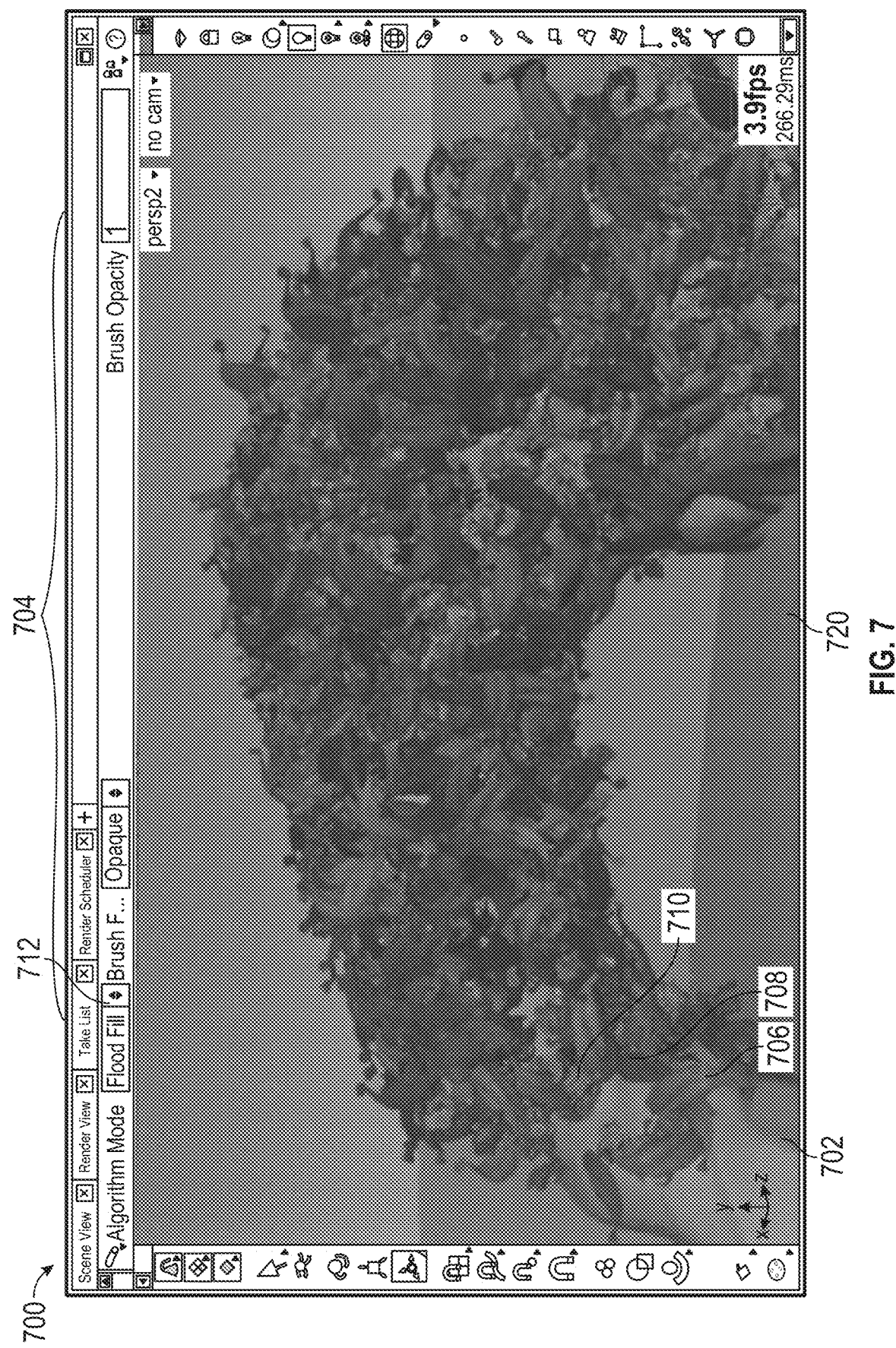
FIG. 7 depicts an exemplary user interface illustrating an algorithm-based operation for modifying instances of a computer-generated asset of an animation scene in accordance with some embodiments.

FIG. 7 depicts an exemplary user interface 700 illustrating an algorithm-based operation for modifying instances of a computer-generated asset of an animation scene in accordance with some embodiments. As described above, the animation program can perform an algorithm-based operation with respect to instances of one or more computer-generated assets. An algorithm-based operation can be performed in accordance with a preconfigured algorithm with respect to multiple instances in absence of a paint stroke. Similar to a paint-stroke based operation, an algorithm-based operation can also be based on representations (e.g., data points) of the instances.

As an example illustrated in FIG. 7, in some embodiments, in an algorithm-based operation, the animation program can receive a user input (e.g., via a text field or a drop-down menu of a user interface 700) requesting to invoke an algorithm-based operation. Based on the user input, the animation program can configure the operating mode to the algorithm mode. An algorithm-based operation can include, for example, a flood-fill operation. A flood-fill operation can randomly generate and place instances across an area of an animation scene. In some examples, to perform a flood-fill operation, the animation program receives one or more user inputs requesting to perform flood-fill operation on animation scene 720. For example, using a drop-down menu 712 on user interface 700, the animation program can receive the user's selection of a flood-fill operation under the algorithm mode. In some examples, the animation program can receive one or more other selections via affordances of user interface 700, such as the number (e.g., 3) and/or type of assets (e.g., bushes, trees, flowers, etc.) to be used for flood fill. The animation program can thus determine that the operation to be performed is an algorithm-based flood-fill operation. In some examples, a flood-fill operation can be used to generate a base layer or coat of an animation scene. A flood-fill operation can be followed by other operations such as a culling operation (described in more detail below) and a paint-stroke based operation.

In some examples, based on the user inputs, the animation program can further determine one or more attributes associated with an algorithm-based operation. Determining the one or more attributes can include randomly selecting a computer-generated asset for each instance and/or selecting a computer-generated asset for each instance based on the user inputs. As an example, for a flood-fill operation, the user input may not indicate either the number of assets or the type of assets to be used; may indicate only the number of assets; or may indicate only the type of assets. If the user input does not indicate either the number of assets or the type of assets to be used, the animation program can randomly select an asset for each instance to be generated based on available assets. If the user input indicates only the number of assets (e.g., 2), the animation program can randomly select the type of assets (e.g., swoopy fern and desert jade) to be used according to the indicated number of assets and randomly select an asset for each instance to be generated. If the user input indicates the type of assets (swoopy fern and desert jade) to be used, the animation program can randomly select an asset for each instance among the indicated type of assets. In some embodiments, the animation program can also determine other attributes such as colors, shape, dimension, etc., for each instance to be generated in a flood-fill operation. Such determination can include randomly selecting an attribute for each instance and/or selecting the attribute based on user inputs.

In accordance with the determination of the type of operation (e.g., flood fill) and one or more attributes (e.g., 3 types of assets to be used), the animation program can process representations of the instances to be generated. For a flood-fill operation, for example, the animation program can generate representations (e.g., data points) of a pre-determined number of instances of one or more computer-generated assets (e.g., swoopy fern and desert jade); and project the processed representations of the instances onto the animation scene. The pre-determined number of instances can be obtained based on a direct user input (e.g., 1000 instances), a calculation according to a user input of density (e.g., flood-fill the instances to a certain level of density) or other attributes of the instances. As shown in FIG. 7, the animation program can display instances 706, 708, and 710 corresponding to three different types of assets randomly across an area (e.g., a surface area 704 of the rock instance 702) in animation scene 720.

In addition to a flood-fill operation as described above, an algorithm-based operation can include operations for manipulating existing instances, such as global scaling, scaling variation for each of the instances, initial orientation of the instances, algorithm-based color blending of the instances, separating of adjacent instances, and hue-saturation-value (HSV) variation for each of the instances. A global scaling operation can scale all instances on an animation scene by increasing or decreasing the dimensions of instances. A global scaling operation can use one or more scaling algorithms such as nearest-neighbor interpolation, bilinear and bicubic algorithms, sinc and Lanczos resampling, box sampling, Fourier transform, or the like. A scaling variation operation can vary the degree of scaling (e.g., scaling factor, scaling percentage) for each of the instances. The variation can be randomized or controlled (e.g., variation by +/−10%). An initial orientation operation can configure the initial orientation (e.g., horizontal/vertical orientations, angular orientation, etc.) of the instances on the animation scene. The initial orientation can be random or controlled.

A separating operation can separate adjacent instances such that the instances are moved away from each other to avoid overlapping. An HSV variation operation can randomly or selectively vary the hue, saturation, and brightness representations of points in an RGB color model of an instance. An algorithm-based color blending operation relates to blending the color of a first layer and the color of a second layer of one or more instances using an algorithm. As described above, these algorithm-based operations do not require paint strokes and can be performed automatically upon the user's request using, for example, affordances on a user interface (e.g., buttons, drop-down menu, text fields, etc.). As one example, the global scaling operation can be performed with respect to some or all instances on an animation scene, some or all instances that are unconstraint or not baked, or all instances of a type, in absence of paint strokes. For instance, the global scaling operation (or any other operations such as color-blending operation) can be performed to the instances that are not constrained or baked, or that are previously constrained or baked but subsequently unconstrained. In some embodiments, the animation program can receive user inputs to render constrained instances live or render one or more attributes of the instances available for manipulation. For example, based on the user input, the animation program can render the scale attribute of constrained or baked instances to be available for manipulation or variation, while restraining or disallowing other attributes of the instances (e.g., color, texture, etc.) from being manipulated or varied. As a result, a global scaling operation (or any other operations such as color-blending operation) can be performed to scale the instances without affecting other attributes of the instances. Constraining or baking of the instances are discussed in more detail below with respect to FIGS. 12A-12B. As another example, unlike a paint-stroke based color-blending operation, the algorithm-based color-blending operation can be performed using default or user-provided attributes (e.g., RGB vector, reference geometry, etc.), therefore eliminating the requirement for paint strokes.

In some embodiments, the animation program receives one or more user inputs requesting to perform an algorithm-based operation for manipulating existing instances (e.g., global scaling, HSV variation), and determines at least one of the types of operation and attributes associated with the assets to be used in the operation. In accordance with the determination, the animation program can process representations by, for example, manipulating the representations of the existing instances using a corresponding modification algorithm (e.g., calculate the new dimensions of instances using a global scaling algorithm). Based on the manipulated representations of the existing instances, the animation program can project the manipulated representations to the animation scene by displaying the modified instances (e.g., scaled instances, HSV varied instance, etc.).

Figure 8A:
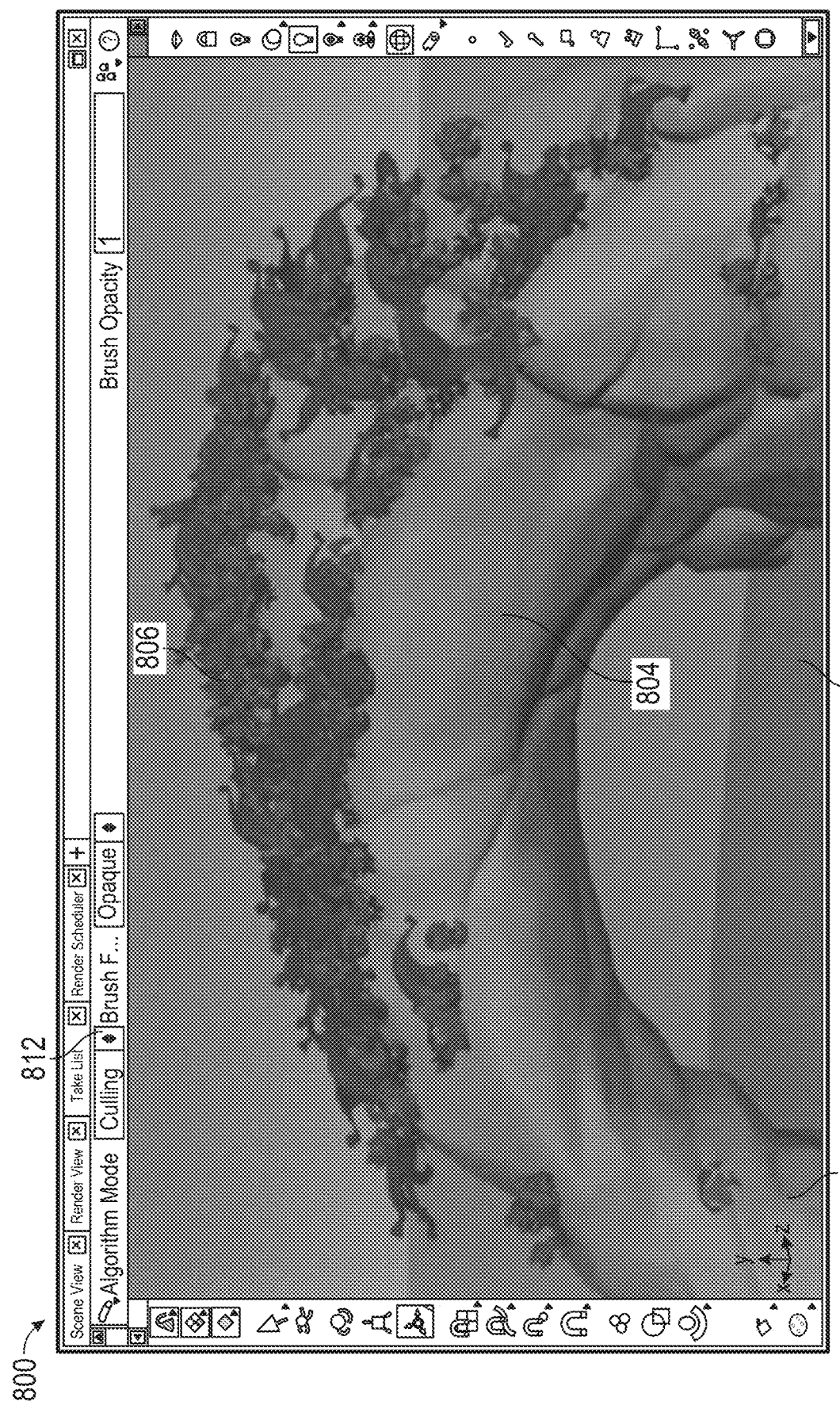
FIG. 8A depicts an exemplary user interface illustrating an algorithm-based operation for culling instances of a computer-generated asset of an animation scene in accordance with some embodiments.

FIG. 8A depicts an exemplary user interface 800 illustrating an algorithm-based operation for culling instances of a computer-generated asset of an animation scene in accordance with some embodiments. A culling operation is an algorithm-based operation that can segregate existing instances from a group according to one or more characteristics associated with the animation scene. A culling operation can be based on one or more of, for example, a camera view, a slope, a position, a noise, a pattern, a textual map, ambient occlusion, and overlapping. A culling operation based on a camera view can erase or remove one or more existing instances that are outside of a camera frustum or view frustum. A camera view captures the display of an animation scene to the user from a particular viewpoint or angle. Different cameras can provide different views of an animation scene. The camera frustum is the field of view of the camera. Culling operations can be performed with respect to instances in the near field (e.g., close to a camera), far field (e.g., far away from the camera), or a combination of near field and far field. In some embodiments, the animation program can also provide animated culling operations, where instances that are positioned outside of the viewing frustum are removed from the culling operation.

In some embodiments, a culling operation based on a slope can erase or remove one or more existing instances disposed in an area having a slope that is above or below a preconfigured slope. FIG. 8A illustrates performing a culling operation based on a specified slope of the underlying surface. In the exemplary culling operation shown in FIG. 8A, some of instances 806 (e.g., swoopy fern instances) are erased from rock area 804 because the slope of rock area 804 is greater than a specified slope (e.g., 45 degree). As a result, instances 806 originally disposed within rock area 804 may appear to be "falling off" because of the steep slope of rock area 804. The "falling off" of the instances generally refers to the effect of variation of one or more attributes of the instances. For example, the density of instances within rock area 804 (where a slope is greater than 45 degree) is less than the density of instances in other areas where the slope is less than 45 degree (e.g., top of the rock). It is appreciated that "falling off" can refer to any effect of variation of any attributes in any manner (e.g., a customized "falling off" such that the instances have a high density in a first area, a medium density in second area, and a high density in a third area). In some embodiments, the rate of "falling off" can vary based on the degree of the slope. For example, the rate of "failing off" based on an 80-degree slope can be higher than that based on a 40-degree slope. In some embodiments, "falling off" of the instances generates an effect that can more naturally match the reality.

In some embodiments, a culling operation based on a position can erase or remove one or more existing instances disposed in an area having a height that is greater than or less than a preconfigured height. For example, some instances of plants can be removed from a height above a threshold height in an animation scene, reflecting the reality this type of plants usually does not grow above the threshold height. In some examples, a culling operation based on a position can optionally include a falloff effect of the instances to be removed.

In some embodiments, a culling operation based on noise or a pattern can erase or remove one or more existing instances having noise that is above or below a preconfigured threshold. An instance of an asset can be associated with a world space position. The world space is a space in which instances of assets are combined to create an environment to be viewed. The world space can also be a space in which light sources and cameras are placed. Each instance in the world space can have an associated position. In some examples, the world space positions of an instance can be determined based on a local space and/or a noise space. Instances in a local space or a noise space can have associated noise patterns. Thus, a culling operation based on noise can remove instances whose world space positions having associating noise patterns above or below a certain threshold. A culling operation based on computer graphics can receive computer graphics and erase or remove existing instances by luminance. For example, certain instances that have luminance above (e.g., too bright) or below (e.g., too dark) threshold luminance may be erased. A culling operation based on ambient occlusion can erase or remove one or more existing instances that are disposed within or outside of, for example, a crevice, a crack, or an underside of geometry. A culling operation based on overlapping can erase or remove one or more existing instances that overlap with each other. For example, instances of a bush and a tree may be overlapping each other at a particular position of an animation scene. Performing a culling operation based on overlapping can erase one instance (either the bush or the tree), and preserve the other instance.

As illustrated in FIG. 8A, in some embodiments, in performing a culling operation, the animation program can receive one or more user inputs (e.g., via a drop-down menu 812 of user interface 800) requesting to perform a culling operation. Based on the user inputs, the animation program determines the type of operation and optionally one or more attributes (e.g., a slope threshold, a height threshold, a noise threshold, etc.). In accordance with the determination, the animation program can process representations of existing instances by manipulating the representations for culling of the instances. For example, the animation program can designate those instances disposed in a rock area having a slope that is greater than a slope threshold for erasing. The animation program can thus project the processed representations to the animation scene. For example, the animation program can erase, from displaying, the one or more existing instances associated with the one or more representations designated for erasing as a result of culling-by-slope. In some examples, the removal or erasing of the one or more existing instances designated for culling represents the effect of "falling off" (e.g., variation of attributes of the instances, such as density, color, type, etc.).

Figure 8B:
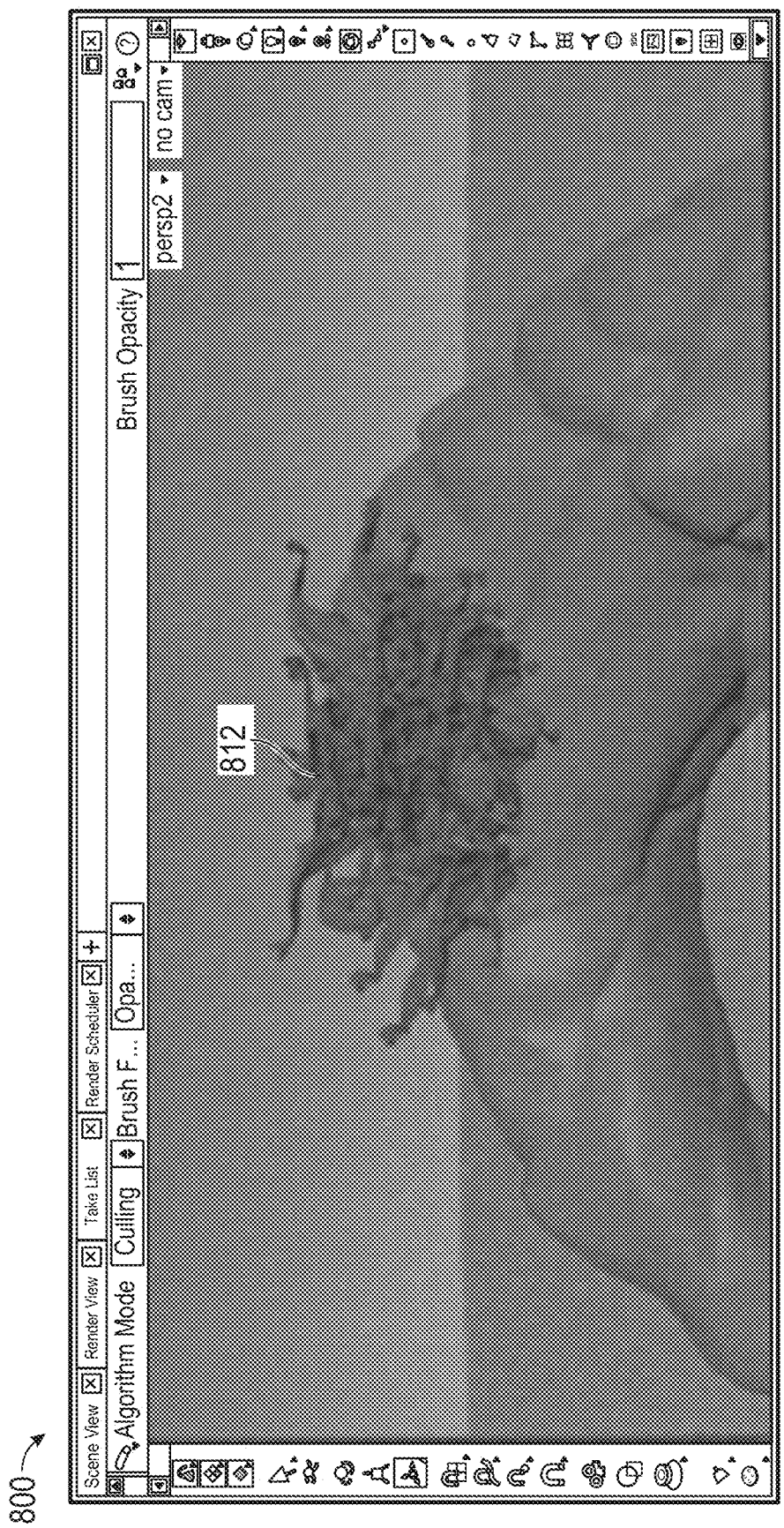
FIGS. 8B-8D depict an exemplary user interface illustrating an algorithm-based operation for relaxing instances of a computer-generated asset of an animation scene in accordance with some embodiments.
Figure 8C:
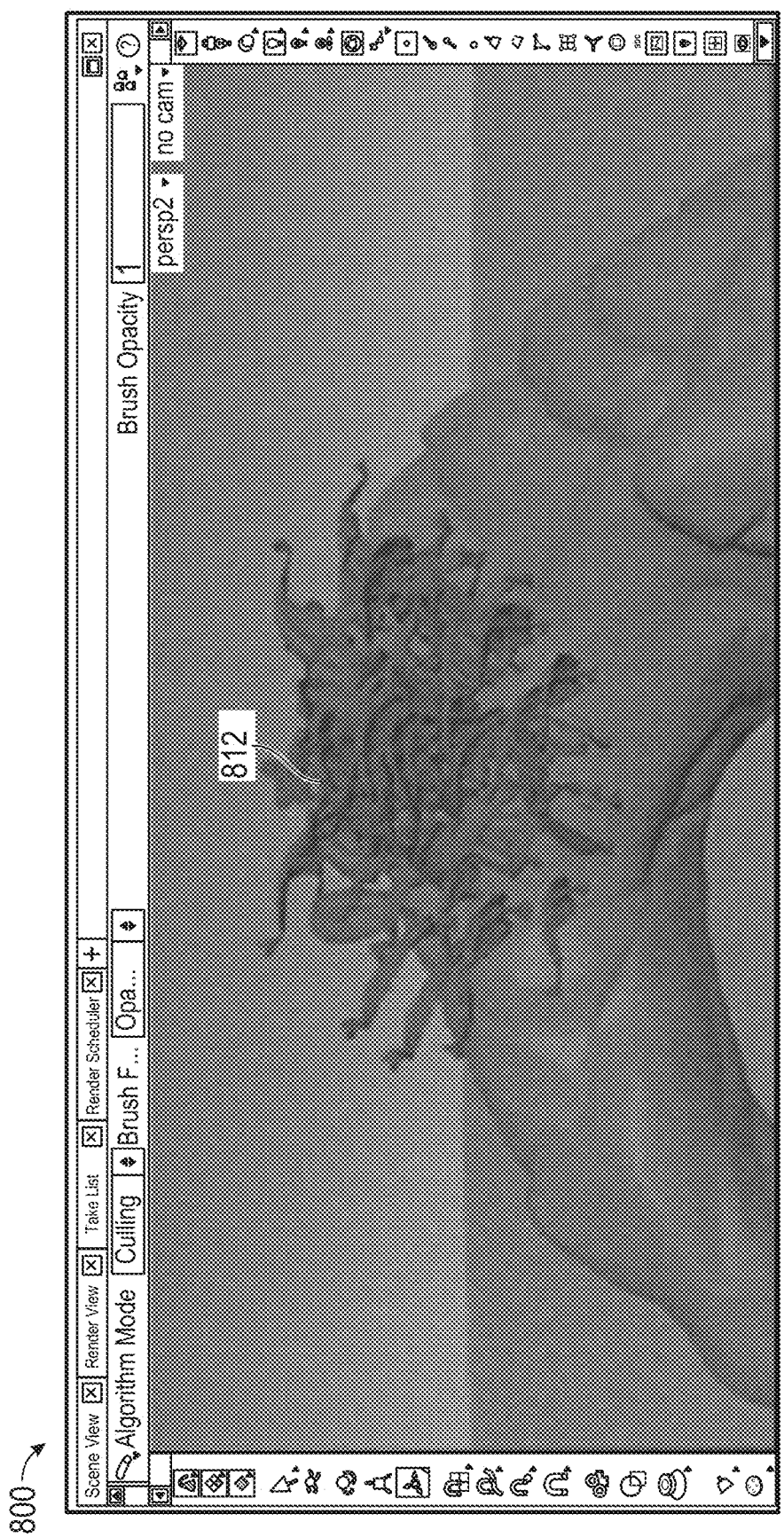
Figure 8D:
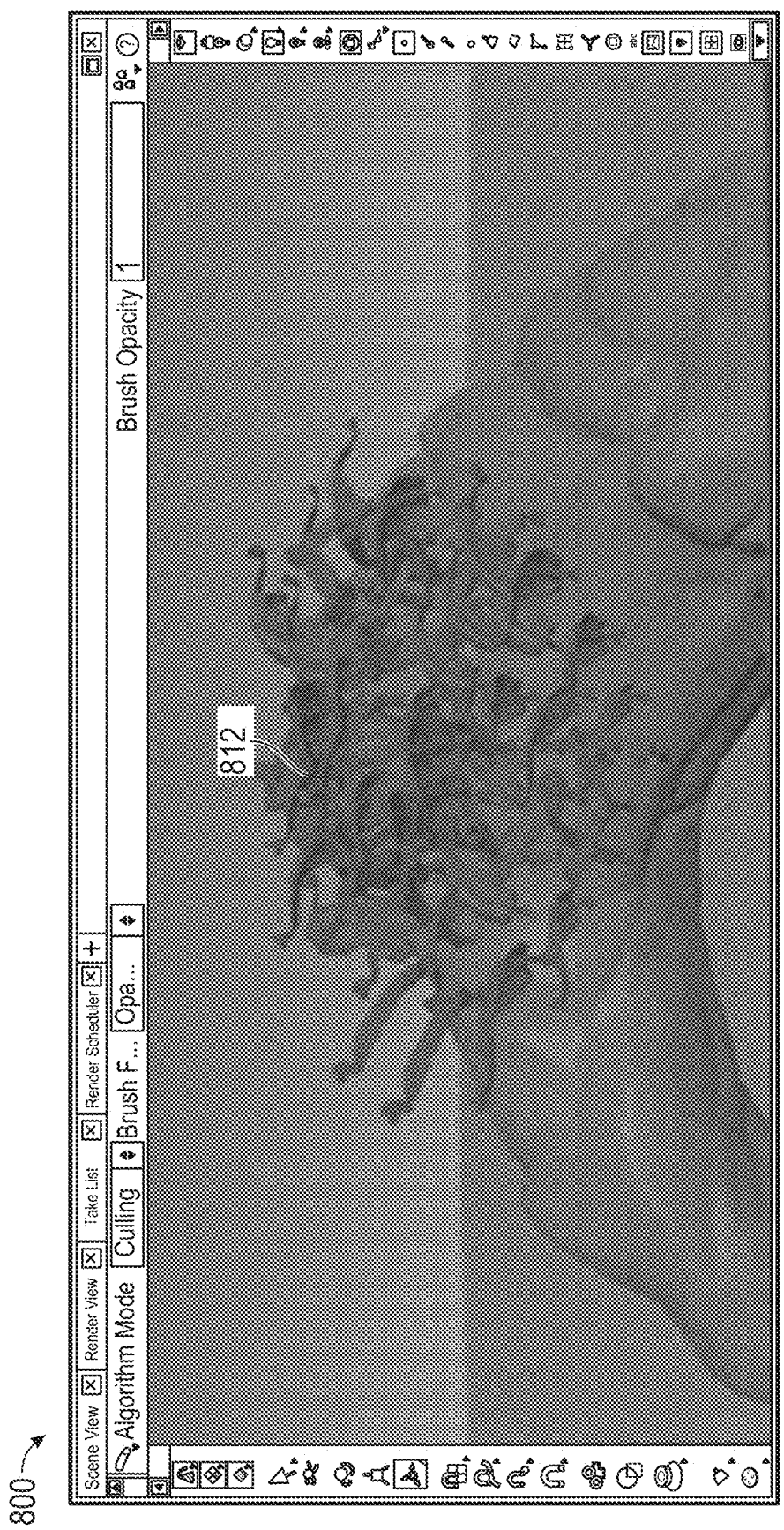

In some embodiments, the animation program can perform a relaxing operation. A relaxing operation can be applied to one or more instances such that the degree of overlapping of the instances reduces. FIGS. 8B-8D depict an exemplary user interface illustrating an algorithm-based operation for relaxing instances of a computer-generated asset of an animation scene in accordance with some embodiments. FIG. 8B illustrates instances 812 with no relaxing applied. FIG. 8C illustrates instances 812 with some relaxing applied such that the instances 812 have less overlapping with one another. FIG. 8D illustrates instances 812 with lots of relaxing applied (e.g., the plants have more reduced overlapping with one another).

As described above, an algorithm-based operation can include flood-fill operation, various modification operations (e.g., global scale, initial orientation, etc.), and various culling operations. It is recognized the animation program can be configured to perform any other desired algorithm-based operations.

Figure 9:
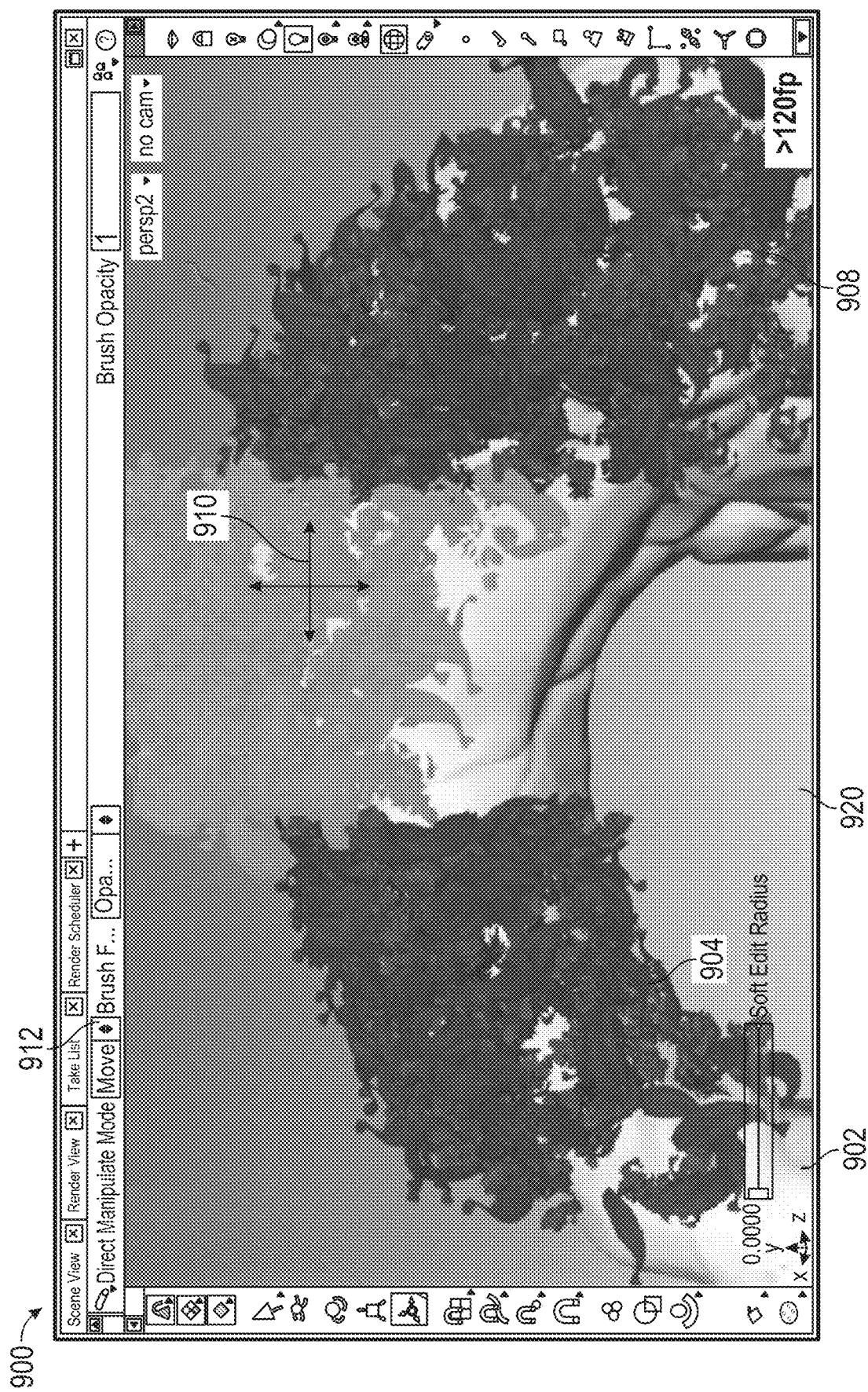
FIG. 9 depicts an exemplary user interface illustrating a direct-manipulating operation for directly manipulating existing instances of a computer-generated asset of an animation scene in accordance with some embodiments.

FIG. 9 depicts an exemplary user interface 900 illustrating a direct-manipulating operation for directly manipulating existing instances of a computer-generated asset of an animation scene in accordance with some embodiments. As described above, the type of operation that the animation program can perform can include a direct-manipulating operation. A direct-manipulating operation can be performed directly on the geometry of instances visualized in the animation scene, rather than manipulating underlying representations (e.g., data points) of the instances and projecting the manipulated representations to display the geometry of the instances on the animation scene. A direct-manipulating operation can include modification of the existing instance by, for example, moving, transforming, rotating, scaling, and erasing, etc., the geometry of the instances.

For example, as shown in FIG. 9, the animation program can receive a user input requesting to perform a direct-manipulating operation such as moving one or more existing instances (e.g., using a drop-down menu 912) in a direct manipulating mode. Based on the user input, the animation program can determine that the type of operation is a direct-manipulating operation. In accordance with the determination, the animation program can process the representations of the existing instances (e.g., instances 904, 908, and 910) to enable direct-manipulating by the user. In some examples, the animation program can generate primitive data based on the representations of the instances. Primitive data represents actual geometry of the instances while the representations of the instances are data points stored in a data structure. In some embodiments, the geometry of instances displayed using primitive data can be directly manipulated by the user without first manipulating of the underlying data points of the instances.

After generating the primitive data, the animation program can display or re-display the geometry of the existing instances using the corresponding primitive data to enable direct manipulation by the user. In some embodiments, the animation program can receive manipulation of the displayed geometry of the instances directly from the user. For example, as shown in FIG. 9, the animation program can receive a user input to move the geometry of instances 910 with respect to those of instances 904 and 908 on animation scene 920. After receiving such user input, the animation program can display the geometry of the manipulated (e.g., moved) instances 910. In some embodiments, the animation program can generate representations of the manipulated instances. For example, as shown in FIG. 9, after instances 910 are moved to its new position, the animation program can generate data points representing the moved instances 910 based on the primitive data of moved instances 910. Converting the primitive data back to representations of the instances (e.g., data points) enables further operations such as paint-stroke based or algorithm-based operations to be performed on the instances.

In some embodiments, the animation program can perform an animation operation. In an animation operation, one or more instances can be animated or deformed. To perform an animation operation, the animation program receives one or more user inputs requesting to animate one or more instances of an animation scene. For example, the user inputs may indicate an animation of fake wind is to be performed. Fake wind animation animates a rotation of one or more instances at its original position, therefore adding the effect of a motion caused by wind to, for example, background plants (e.g., trees, bushes, flowers). Based on the user inputs, the animation program determines that the type of operation is animation (e.g., fake wind animation), and processes the representations of the instances. In some embodiments, the animation program can associate an animated motion with the representations of the instances. For example, the animation program can associate a rotation or swing motion with certain instances (e.g., instances of trees). The animation program can thus display an animation of the instances in accordance with the animated motion.

Figure 10:
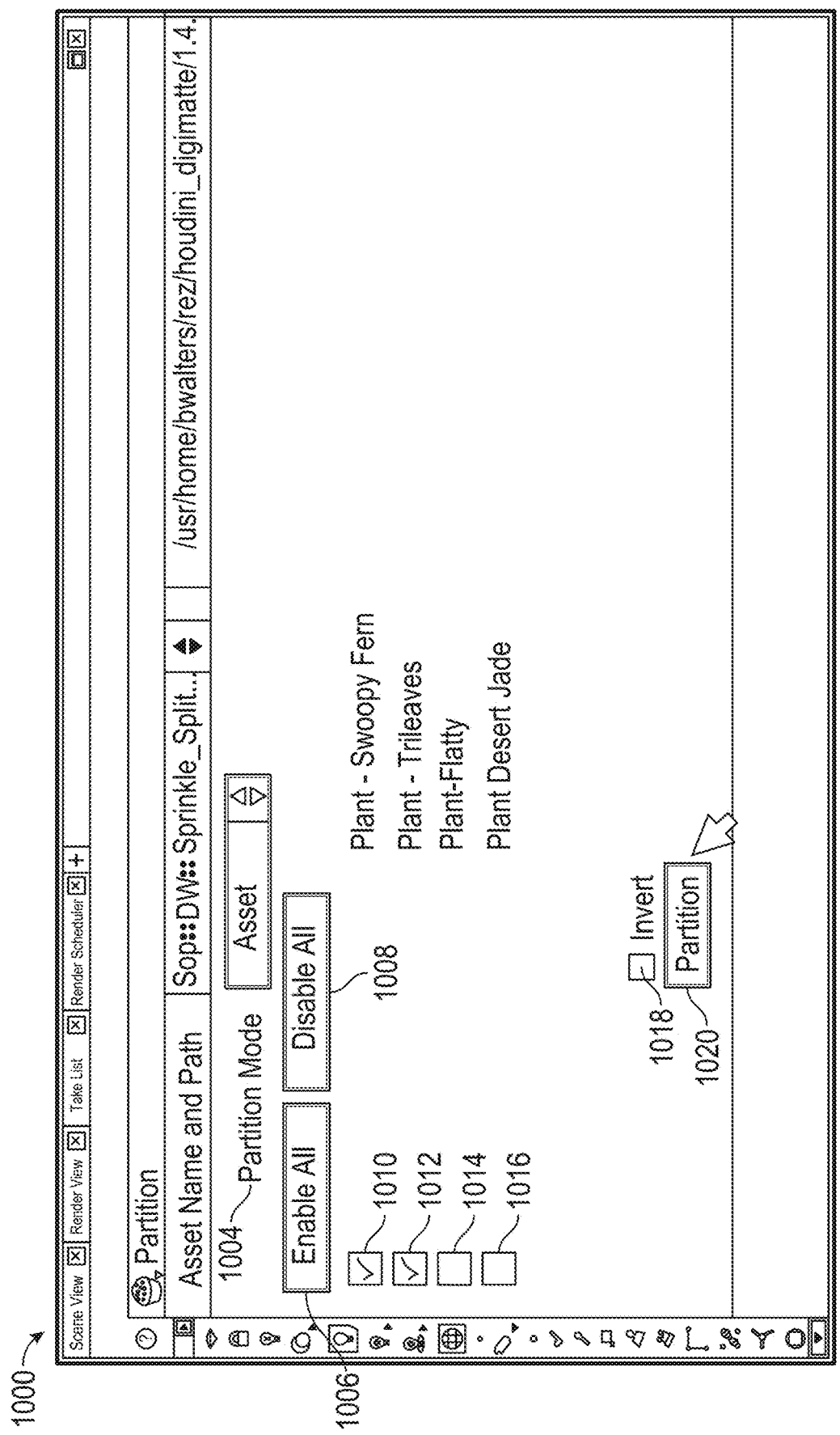
FIG. 10 depicts an exemplary user interface for receiving user input requesting for partitioning a plurality of instances of a computer-generated asset of an animation scene in accordance with some embodiments.

In some embodiments, the animation program can perform a partition operation. FIG. 10 depicts an exemplary user interface 1000 for receiving a user input requesting to partition a plurality of instances of a computer-generated asset of an animation scene in accordance with some embodiments. A partition operation can segregate a plurality of existing instances to two or more separate groups of instances. Partitioning of instances can facilitate organizing data for rendering layers, handing off to other designers, or structuring an animation scene.

With reference to FIG. 10, to perform a partition operation, the animation program can receive one or more user inputs requesting partitioning via, for example, a user interface 1000. User interface 1000 can include a plurality of affordances (e.g., drop-down menu 1004, buttons 1006, 1008 and 1020, and checkboxes 1010, 1012, 1014, 1016, and 1018) to receive one or more selections associated with the partition operation. For example, the user may select a partition mode to be partition-by-asset using drop-down menu 1004. Partition-by-asset allows segregating the instances of two or more assets into a plurality of groups. After partitioning, at least some of the plurality of groups includes instances of only one type of asset.

As an example shown in FIG. 10, the user may select, using checkboxes 1010 and 1012, an asset of swoopy fern and an asset of trileaves. As another example, the user can select all assets or select no asset using buttons 1006 ("Enable All") and 1008 ("Disable All"), respectively. The user can also invert the selection using button 1018. Based on the user inputs, the animation program can determine the type of partition (e.g., partition-by-asset) and attributes associated with the partition (e.g., enabling "swoopy fern" and "trileaves" partition). In accordance of the determination, the animation program can identify representations of a plurality of groups of instances. For example, the animation program can identify representations of a first group of the existing instances (e.g., a group of swoopy fern instances) and representations of a second group of the existing instances (e.g., a group of trileaves instances). In some embodiments, the identification begins after the user press the partition button 1020 of user interface 1000. Based on the identification, the animation program can project the identified representations of the plurality of groups of instances onto one or more animation scenes. For example, in accordance with the identification of the respective representations of the first group and second group, the animation program can display the first group of instances (e.g., swoopy fern instances) on a first animation scene and display the second group of instances (e.g., trileaves instances) on a second animation scene.

Figure 11A:
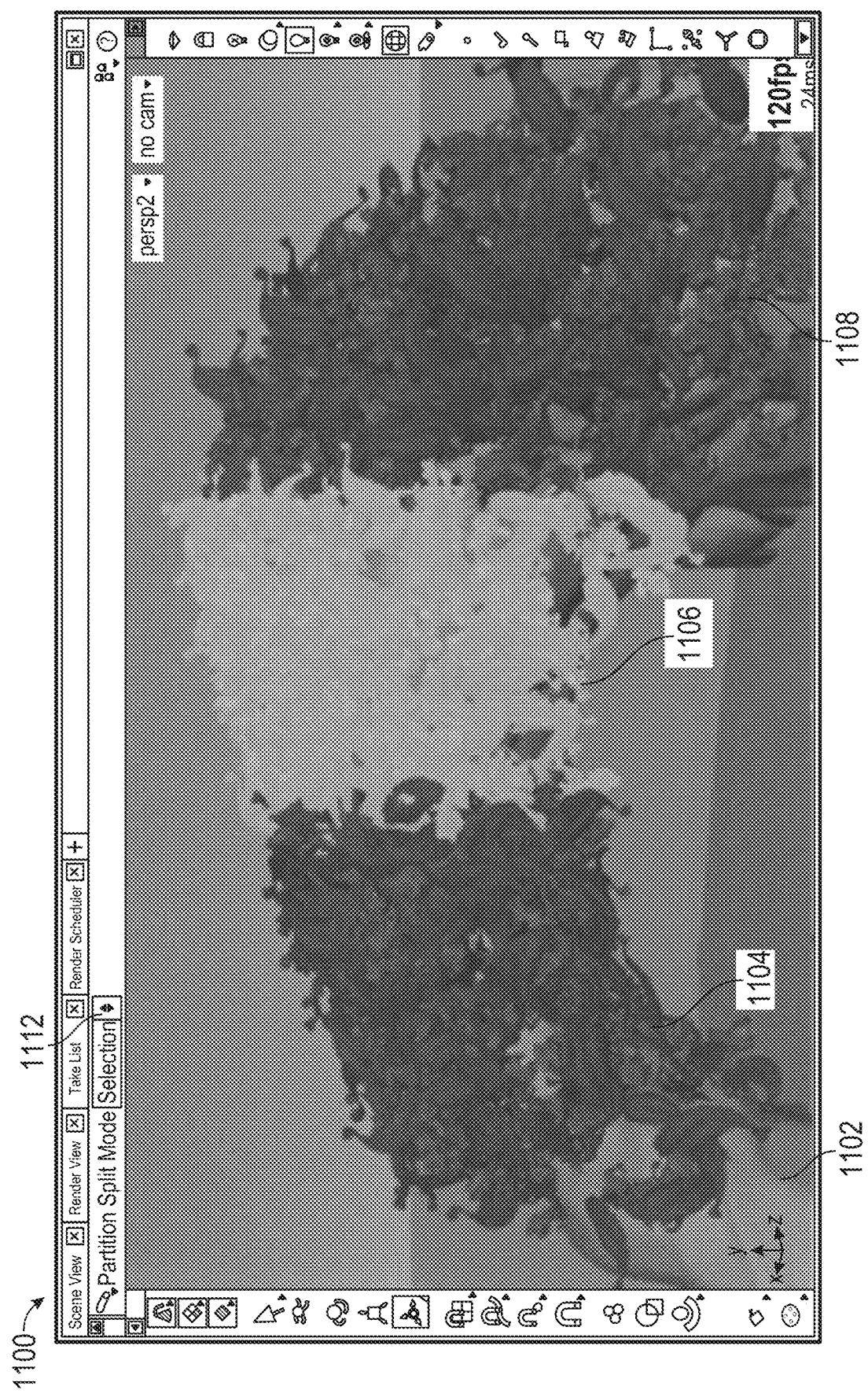
FIGS. 11A-11E depict exemplary user interfaces illustrating various partitioning operations of instances of a computer-generated asset in accordance with some embodiments.
Figure 11B:
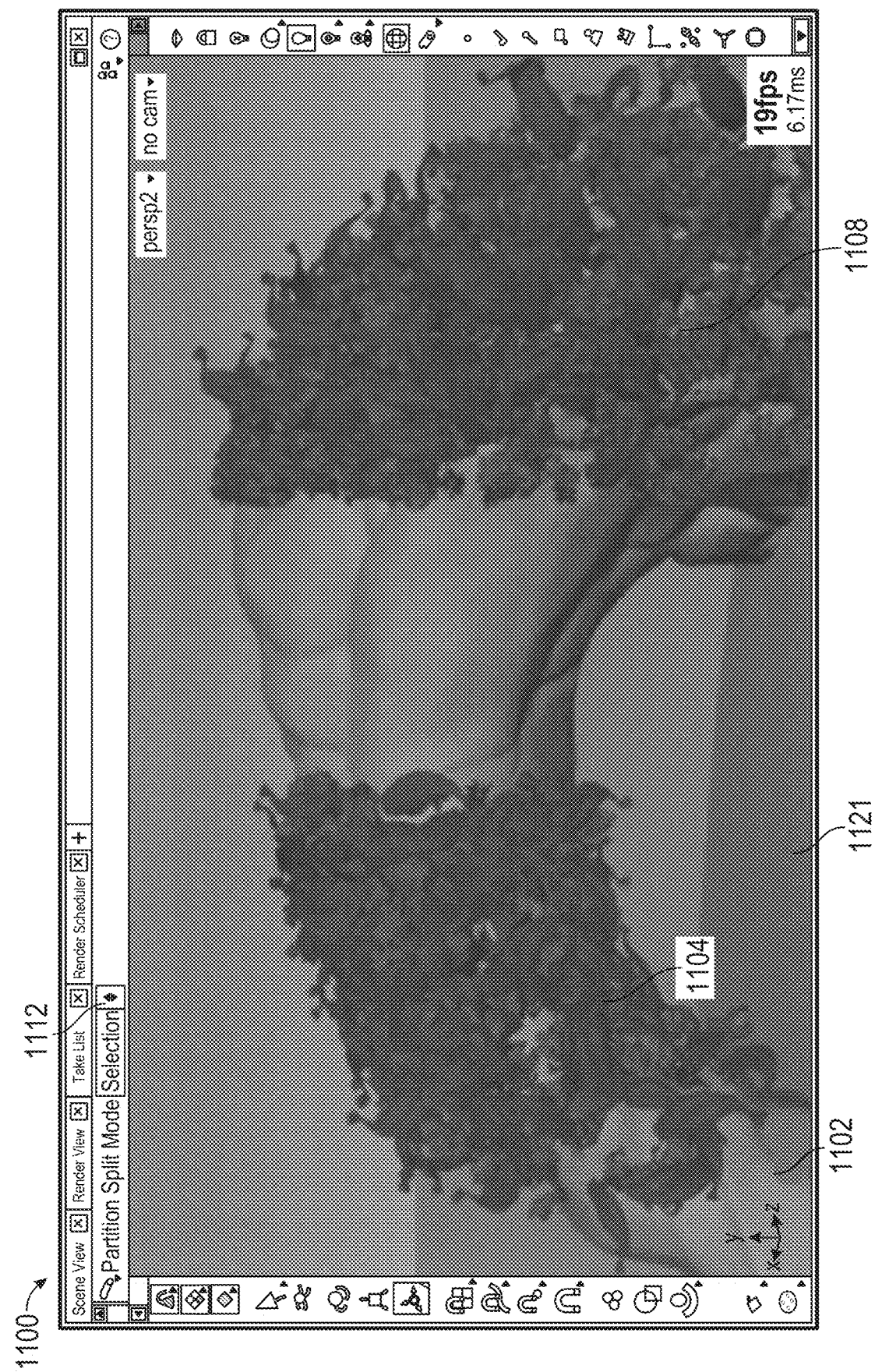
Figure 11C:
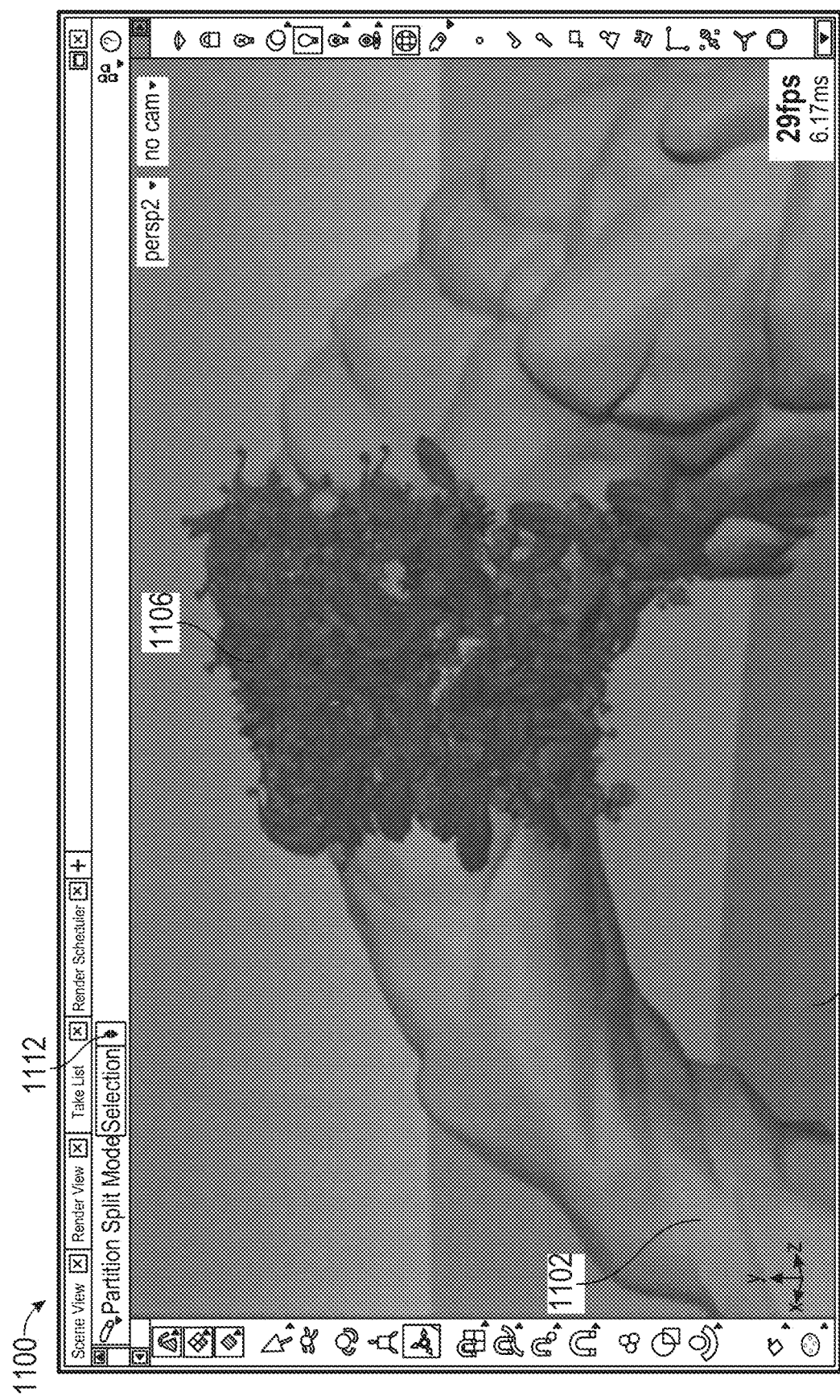

FIGS. 11A-11C depict an exemplary user interface 1100 illustrating a partition operation of instances of a computer-generated asset in accordance with some embodiments. With reference to FIG. 11A, to perform a partition operation, the animation program can receive one or more user inputs requesting to perform a partition operation via user interface 1100. User interface 1100 can include a plurality of affordances (e.g., drop-down menu 1112) to receive one or more selections associated with the partition operation. For example, the user may select a partition split mode to be partition-by-selection using drop-down menu 1112. Partition-by-selection allows segregating the instances into a plurality of groups based on the user's selection. As illustrated in FIG. 11A, the user may select, for example, instances 1106 (i.e., the middle portion of plants covering the surface of rock 1102) to be separated from instances 1104 and 1108.

Based on the user inputs, the animation program can determine the type of partition (e.g., partition-by-selection) and attributes associated with the partition (e.g., the user selected instances 1106 relative to other instances). In accordance of the determination, the animation program can identify representations of a plurality of groups of instances. For example, the animation program can identify representations of a first group of the existing instances (e.g., the group of instances 1106) and representations of a second group of the existing instances (e.g., the group of instances 1104 and 1108). The animation program can thus project the identified representations of the plurality of groups of instances onto one or more animation scenes. For example, in accordance with the identification of the respective representations of the first group and second group, the animation program can display the first group of instances (e.g., instances 1106) on a first animation scene (e.g., scene 1122 shown in FIG. 11C) and display the second group of instances (e.g., instances 1104 and 1108) on a second animation scene (scene 1121 shown in FIG. 11B). As a result, the instances 1104, 1106, and 1108 as shown in FIG. 11A are effectively segregated.

Figure 11D:
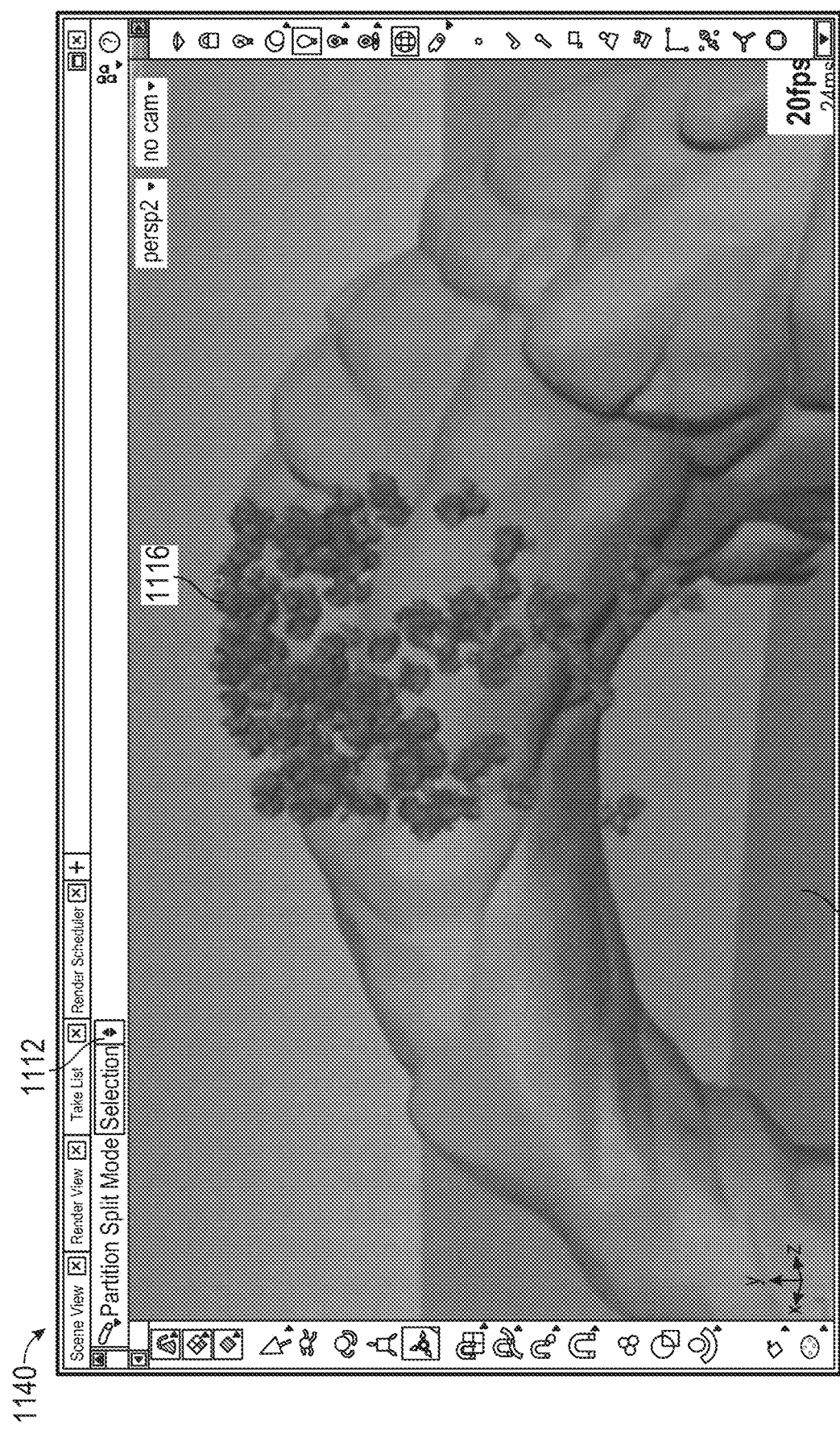

FIG. 10 and FIGS. 11A-11C illustrate partition operations such as partition-by-asset and partition-by-selection. It is recognized that a partition operation can include any desired type of partition, such as partition-by-color or partition-by-size. In some embodiments, the type of operation can be a combination of two or more partition operations. For example, FIG. 11D depicts an exemplary user interface 1140 illustrating the result of a combination of partition operations of instances of a computer-generated asset in accordance with some embodiments. With reference to FIG. 11D, a partition-by-asset operation described above with respect to FIG. 10 and a partition-by-selection operation described above with respect to FIGS. 11A-11C can be combined to generate the result as shown in FIG. 11D. As shown in FIG. 11D, by combing the two types of partition operations, the animation program can generate an animation scene 1125 including instances 1116 that correspond to a single type of asset (e.g., desert jade) as a result of partition-by-asset and correspond to a portion selected by the user (e.g., the middle portion) as a result of partition-by-selection.

Figure 11E:
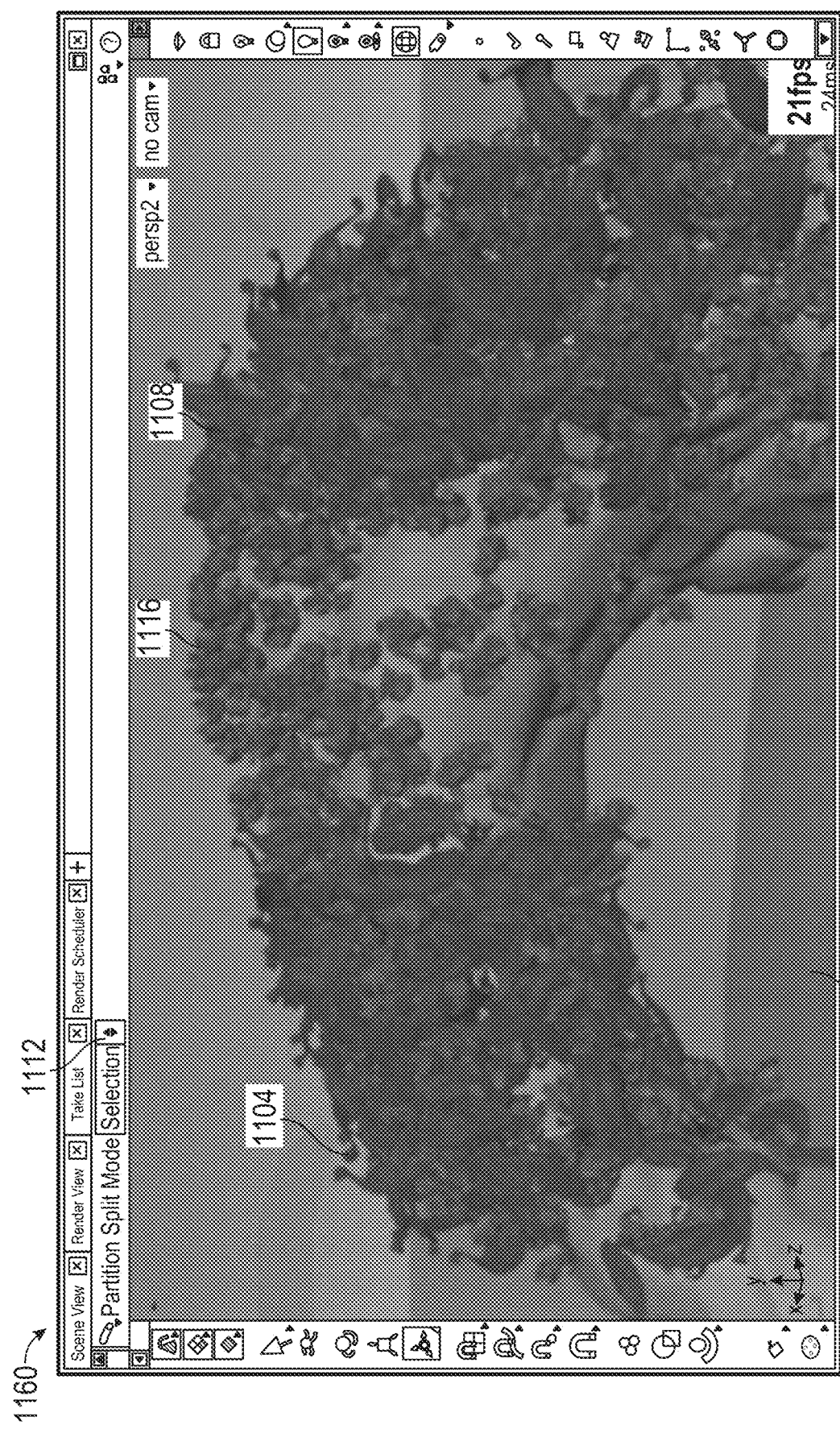

In some embodiments, instances generated from one or more partitioning operations can be combined, integrated, or fused together. FIG. 11E depicts a user interface 1160 illustrating combining two groups of instances to generate a combined animation scene. For example, the animation program can receive a user input requesting to combine instances 1116 (shown in FIG. 11D) with instances 1104 and 1108 (shown in FIG. 11B). As described above, instances 1116 and instances 1104 and 1108 are instances resulted from various partition operations. Based on the user inputs, the animation program can determine the type of operation is to combine instances resulted from previous partition operations. In accordance with the determination, the animation program can identify representations of a first group of instances (e.g., instances 1116) and a second group of instances (e.g., instances 1104 and 1108), and display the first and second groups of instances on a single animation scene (e.g., scene 1126). This effectively combines the two groups of instances resulted from partition operations. It is recognized that the animation program can perform one or more partition operations and one or more combining operations in any desired order to generate any desired animation scene.

Figure 12A:
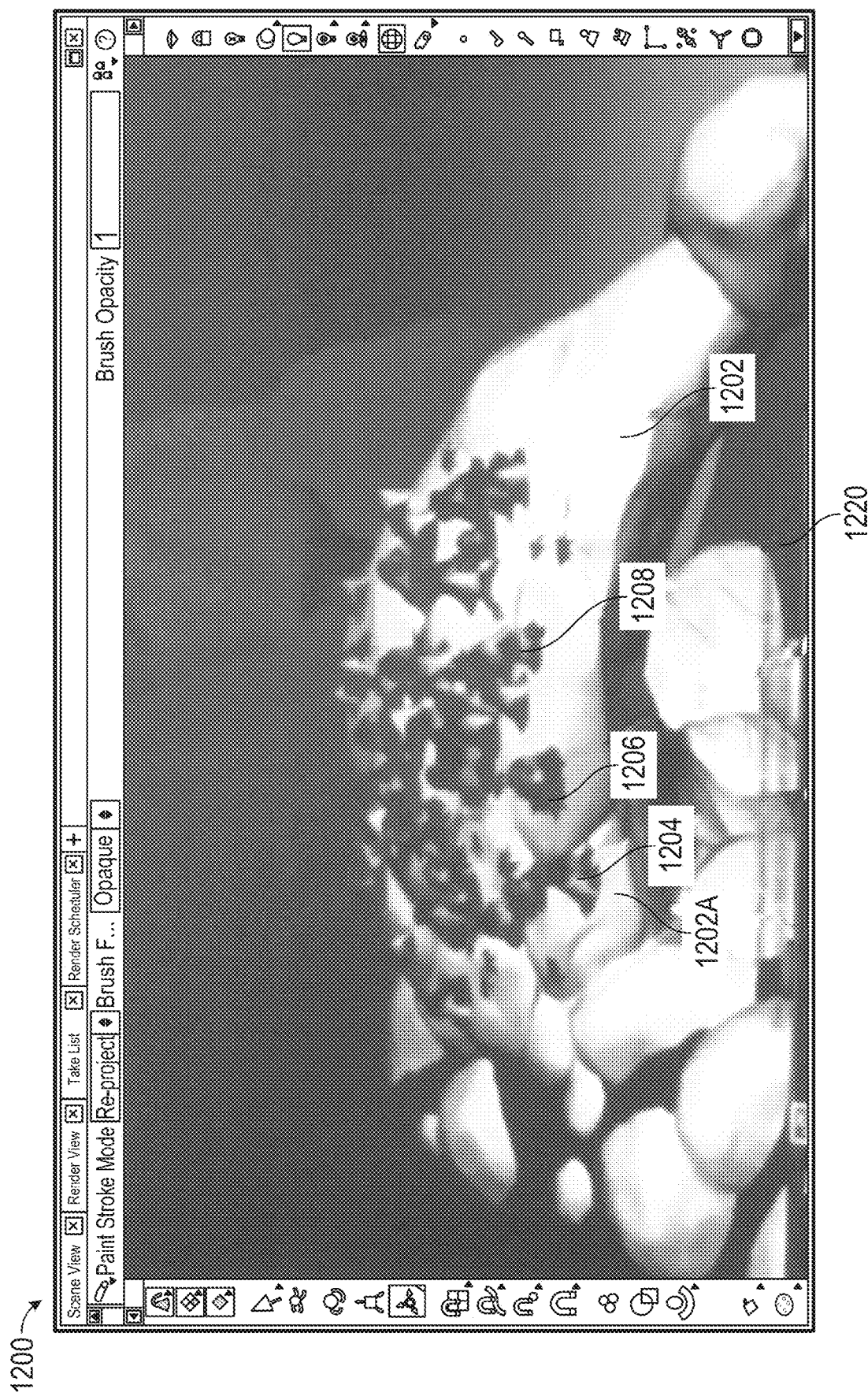
FIGS. 12A-12B depict an exemplary user interface illustrating a re-projecting operation for instances of a computer-generated asset of an animation scene in accordance with some embodiments.
Figure 12B:
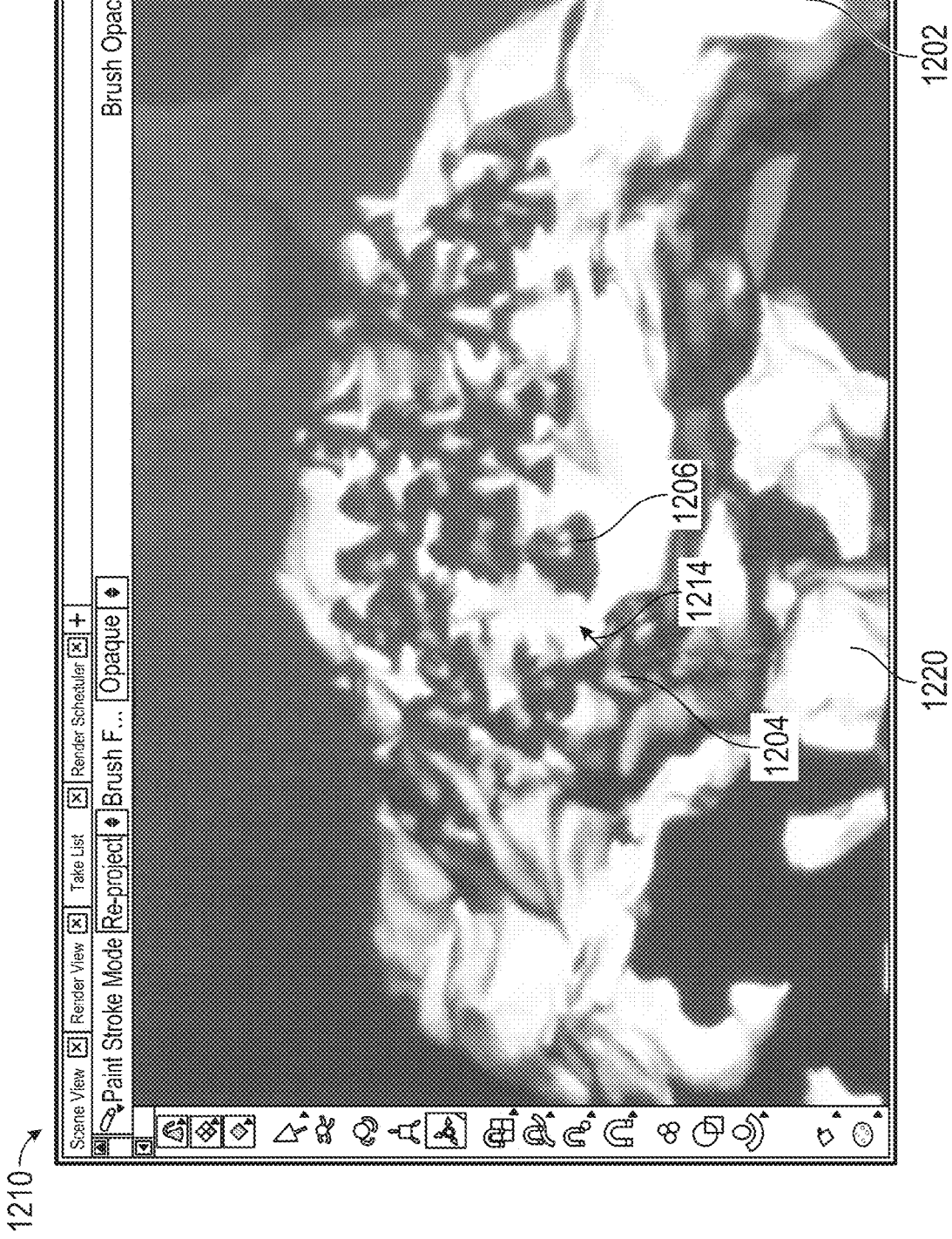

FIGS. 12A-12B depict an exemplary user interface 1200 illustrating a re-projecting operation for instances of a computer-generated asset of an animation scene in accordance with some embodiments. As described above, the animation program can perform various operations (e.g., a paint-stroke operation) requested by the user. In some embodiments, the instances resulted from these operations are not constrained in place and can thus be modified again with another operation. For example, in a first operation, instances of a swoopy fern may be disposed in one place; and in a second operation, the same instances of swoopy fern may be culled to another place. Thus, because the instances resulted from the first operation are not constrained in place or baked, the second operation can affect the same instances used in the first operation. These instances are referred to as live instances. Live instances are not constrained in place with respect to other instances or layers of an animation scene. Attributes of the live instances can be readily manipulated or varied.

Under some circumstances, a user may want to constrain the existing instances in place so that further operations are only performed with respect to new instances without affecting the existing instances. An instance that is constrained in place with respect to other instances or layers of an animation scene is also referred to as a constrained or baked instance. In some embodiments, constraining or baking the instances in place can enable optimization of the process of generating animation scenes. For example, by constraining the instances in place, the animation program may only be required to process the other live instances, therefore reducing the time for generating an animation scene. In some embodiments, constrained or baked instances of animated assets can enable efficient layering of the instances. For example, the animation program can perform one or more paint-stroke operations to generate a plurality of rock instances and then constrain them in place as a first layer. The animation program can then perform another paint-stroke operation to generate additional rocks and then constrain them in place as a second layer, and so on. In some examples, the second layer of rocks, constrained in place as a group, can be placed on top of the first layer of rocks, thereby generating an effect of rock piling on an animation scene. In some embodiments, the constrained instances can be used in a dynamic mode as collision geometry. In a dynamic mode, the instances are processed to reflect reality in such that the instances are placed more naturally. For example, in a dynamic mode, a second layer of constrained rocks can be piled on top of the first layer of rocks in a manner that more naturally reflects the effects of gravity or other factors that may affect the special relation of the rocks between each other.

Under various circumstances, constrained or baked instances may be required to be manipulated. For example, as shown in FIG. 12A, an animation scene 1220 may include underlying rock instances 1202 and a plurality of character instances (e.g., instances 1204, 1206, and 1208) disposed on the surface of rock instances 1202. The plurality of character instances shown in FIG. 12A may be constrained or baked in place such that their positions with respect to the underlying rock instances 1202 are fixed. With reference to FIG. 12B, under some circumstances, after constraining the character instances in place, the geometry or surface of the underlying rock instances 1202 may vary due to any number of reasons (e.g., due to model change). As a result, the spatial relation of at least some of the character instances with respect to the surface of rock instances 1202 may also vary. The variation of the spatial relation may or may not require re-projecting of the character instances. As an example, as shown in FIG. 12B, after the variation of the geometry of underlying rock instances 1202, a character instance 1206 may still be disposed properly on top of the surface of rock instances 1202, and therefore may not require re-projecting. As another example, as shown in FIG. 12A, character instance 1204 may be originally disposed on top of a rock instance 1202A properly. As shown in FIG. 12B, after the geometry of the underlying rock instances 1202 varies, character instance 1204 may no longer be properly disposed on the surface of a rock instance, but may appear to be hanging in the air. As a result, re-projecting of character instance 1204 may be required.

In some embodiments, the animation program can re-project constrained or baked instances. As describe above, the animation program can perform various operations with respect to live instances or some attributes of constrained instances (e.g., a scale attribute may be manipulated but not other attributes). The performance of the operations can include processing representations (e.g., data points) of the instances. In some examples, the animation program can generate metadata associated with the representations of the instances. For example, the animation program can generate and store the original positions (e.g., positions in a world-space) of instances in a camera plane before an operation is performed and positions after the operation is performed. The metadata can thus enable re-projecting of the processed representations of the one or more instances irrespective of the one or more instances being constrained in place. For example, as shown in FIG. 12B, the animation program can determine that the geometry of the surface underlying the constrained character instance 1204 has been modified. In accordance with the determination, the animation program can re-project the representation of instance 1204 (e.g., representation of a paint-stroke based operation that generates instance 1204) onto the modified geometry of the surface of underlying rock instances 1202. In some examples, the re-projecting can be based on the original positions of character instance 1204 in a camera plane and the modified geometry of underlying rock instances 1202. For example, using the original position and modified geometry data, the animation program can determine a proper position for character instance 1204 such that it would not appear to be hanging in the air.

In some embodiments, when the geometry of a surface underlying multiple instances is modified, a complete re-projecting of all instances may not be required. The animation program can determine that some instances do not require any re-projection (e.g., instance 1206) and some instances may require re-projection. In some example, the re-projection can include moving the instance to its nearest proper position with respect to the surface of the underlying instances. For example, the re-projecting of character instance 1204 may include moving or snapping instance 1204 to the nearest position 1214 on the surface of underlying rock instances 1202. As described above, the animation program can also re-project one or more attributes of an instance without affecting other attributes of the instance. For example, re-projection can be made with respect to the position of the instance while keeping the other attributes (e.g., color, texture, brightness) the same.

In some embodiments, re-projecting of instances can be performed with respect to either live instances or constrained/baked instances. As described above, metadata can be generated and stored for each instance and for each operation of the instance. Therefore, using the metadata, re-projecting of an instance can be readily performed regardless of whether the instance is live or constrained.

As described above, the animation program can project processed representations of instances (e.g., representations of instances associated with a paint-stroke based operation) onto an animation scene such that the instances are displayed. In some embodiments, the projection can use various polygon models to balance the projecting (e.g., rendering) speed and the image resolution. For example, under some circumstances, the user may want to see the rough effect of projecting a particular instance onto the animation scene. Thus, the image resolution requirement may not be high but the projecting speed may need to be fast. Under other circumstances, the user may want to see details of a particular instance when it is projected onto the animation scene. Thus, the image resolution requirement may be higher.

Figure 13A:
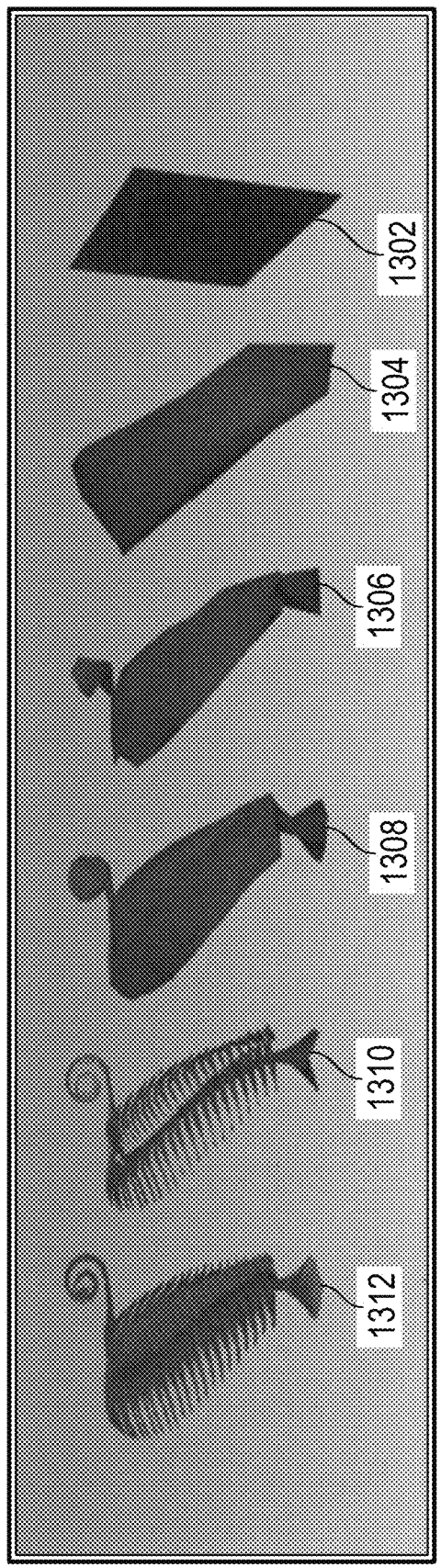
FIGS. 13A-13B depict exemplary polygon models of computer-generated assets in accordance with some embodiments.
Figure 13B:
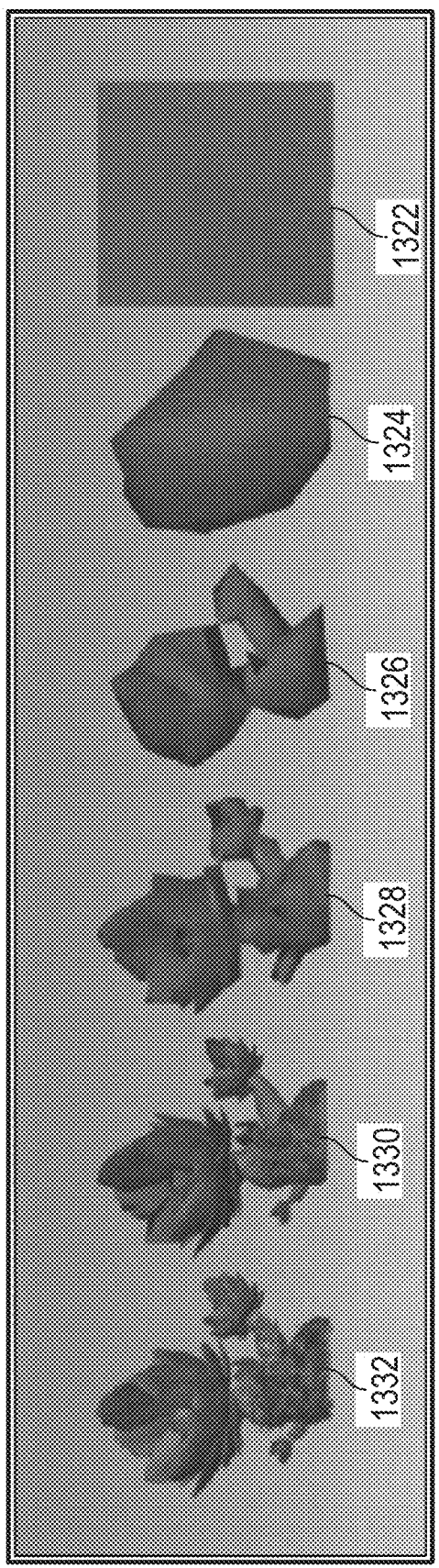

In some embodiments, to balance the requirements for projecting speed and image resolution, the animation program can obtain a plurality of polygon models for each of the computer-generated assets. The plurality of polygon models includes models having different number of polygons and therefore has different image resolutions. For example, the polygon models can include a full-resolution model, a high-resolution mode, a medium-resolution model, a low-resolution model, a box, or a card. The number of polygons in each of these models may be different. For example, a high-resolution model may have 1500 polygons; a medium-resolution model may have 500 polygons; a low-resolution model may have 100 polygons; a box model may have 24 polygons; and a card may have only 1 polygon. FIGS. 13A-13B depict exemplary polygon models of computer-generated assets in accordance with some embodiments. As shown in FIG. 13A, a computer-generated leaf can have, for example, different polygon models 1302, 1304, 1306, 1308, 1310, and 1312, with increasing number of polygons and therefore increasing image resolution and decreasing projecting (e.g., rendering) speed. As shown in FIG. 13B, a computer-generated flower can have, for example, different polygon models 1322, 1324, 1326, 1328, 1330, and 1332, with increasing number of polygons and therefore increasing image resolution and decreasing projecting (e.g., rendering) speed. In some embodiments, the polygon models can be generated by a range LOD (Level of Detail) visualization system.

In some embodiments, the animation program can project the processed representations (e.g., representations of instances in a paint-stroke based operation) of the instances of at least one computer-generated asset onto an animation scene using one or more of the plurality of polygon models. For example, if the user desires to see a rough effect, the animation program can project the representation of an instance using a low-resolution polygon model. If the user desires to see more details of the instance, the animation program can project using a high-resolution or a full-resolution polygon model. Projecting using lower resolution polygon model can be faster than projecting using higher resolution polygon model. Thus, in some examples, the projection can be performed in an iterative manner. For example, the animation program can first display an instance using a card, followed by a box, followed by a low-resolution polygon model, followed by a medium-resolution polygon model, and so on. An iterative projection can balance the often contradicting requirements for fast projecting and high resolution, allowing the user to see a rough effect of a projected instance before seeing more details of the instance.

Figure 14:
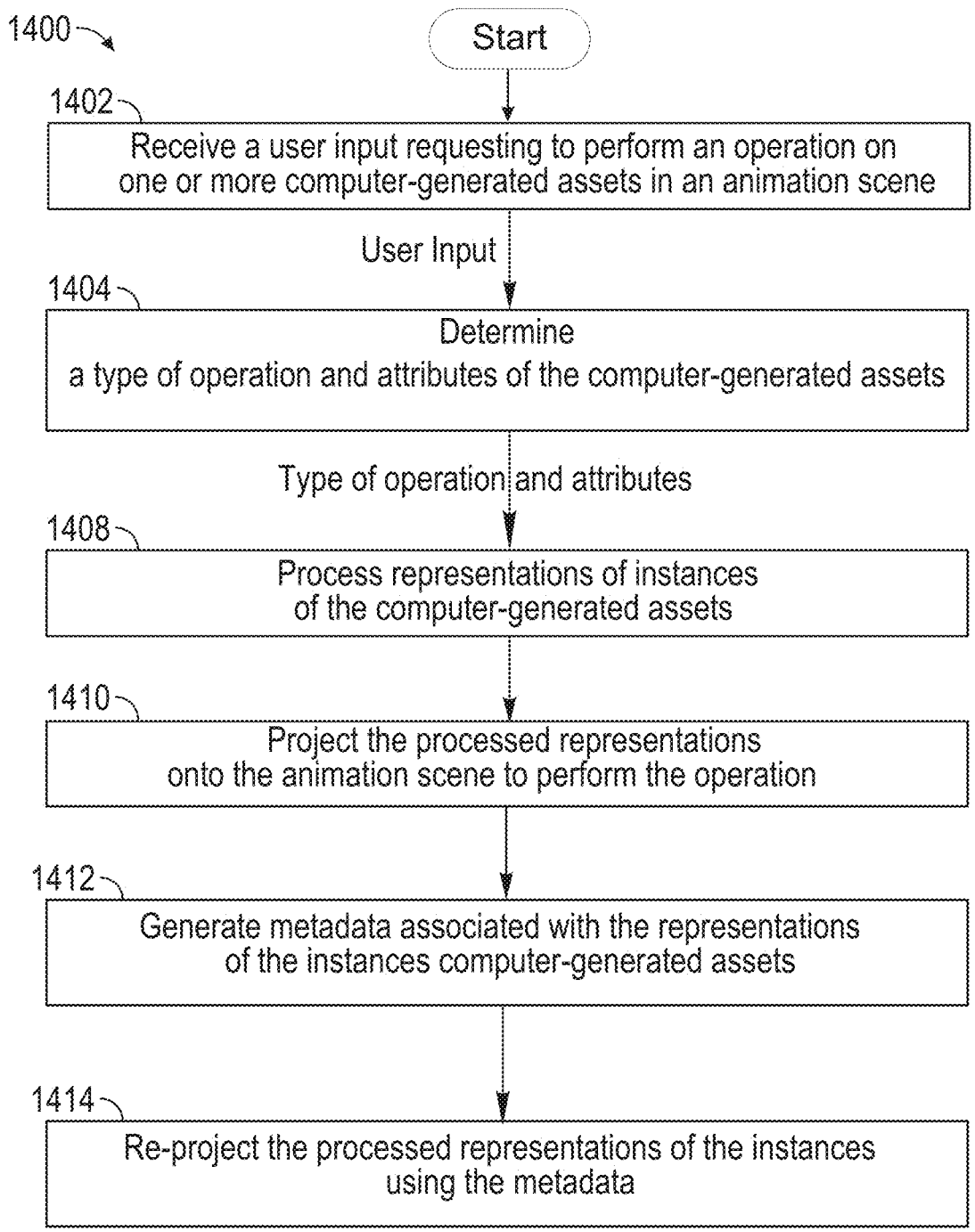
FIG. 14 depicts a flow diagram illustrating an exemplary process for composing an animation scene in a computer-generated animation in accordance with some embodiments.

Turning now to FIG. 14, embodiments and optional features of the techniques described above are discussed with reference to exemplary process 1400. FIG. 14 depicts a flow diagram illustrating process 1400 for composing an animation scene in a computer-generated animation. In some embodiments, portions of process 1400 are performed on one or more computing system, such as computing system 1500 described below with reference to FIG. 15. Portions of process 1400 may be performed on a computing system local to a user. Some portions of process 1400 may be provided as a service by a remote computing system (e.g., a server over the Internet). Some operations in process 1400 may be combined, the order of some operations may be changed, and some operations may be omitted.

At block 1402, a user input requesting to perform an operation on one or more computer-generated assets in an animation scene is received. At block 1404, based on the user input, a type of operation and one ore more attributes associated with the one or more computer-generated assets in the animation scene can be determined. In some embodiments, the type of operation can include one or more of a paint-stroke based operation, an algorithm-based operation, a direct manipulating operation, an animation operation, and a partitioning operation. In some embodiments, the at least one attribute can include one or more of position, radius, color, density, opacity, strength, texture, ramp, and linearity associated with the computer-generated asset in the animation scene, and a type of partition.

Based on the determination of the type of operation and one or more attributes, representations of one or more instances of the at least one computer-generated asset can be processed (block 1408), and the processed representations can be projected (block 1410) onto the animation scene to perform the operation.

At block 1412, in some embodiments, metadata associated with the representations of the one or more instances of the at least one computer-generated asset can be generated. At block 1414, the processed representations of the instances can be re-projected using the metadata. In some examples, The re-projection using the metadata is irrespective of the one or more instances being constrained in place.

In some embodiments, the type of operation user requested can be a paint-stroke based operation. In these embodiments, receiving the user input can include receiving one or more paint strokes with respect to the animation scene. The one or more paint strokes can be associated with a radius and can indicate a curve extending across at least part of the animation scene. In some examples, determining at least one attribute associated with the at least one computer-generated asset includes at least one of: randomly selecting a computer-generated asset for each instance of the one or more instances in the animation scene; and selecting a computer-generated asset for each instance of the one or more instances based on the user input.

In some embodiments where the type of operation user requested is a paint-stroke based operation, processing representations of one or more instances of the at least one computer-generated asset can include generating representations of the one or more instances of the at least one computer-generated asset in accordance with the at least one attribute. In some examples, generating representations of the one or more instances of the at least one computer-generated asset can include generating a plurality of representations of instances of the at least one computer-generated asset in accordance with the radius associated with the one or more paint strokes and in accordance with the curve indicated by the one or more paint strokes. Further, projecting the processed representations of the one or more instances of the at least one computer-generated assets onto the animation scene can include displaying, based on the plurality of generated representations, the one or more instances within the radius associated with the one or more paint strokes. The one or more instances are positioned along the curve indicated by the one or more paint strokes in the animation scene.

In some embodiments, generating representations of the one or more instances of the at least one computer-generated asset can include generating an individual representation of an instance for each separate user input; and projecting the processed representations of the one or more instances of the at least one computer-generated asset onto the animation scene can include displaying, based on the individual representation of an instance for each separate user input, one or more instances of the at least one computer-generated asset in the animation scene.

In some embodiments, generating representations of the one or more instances of at least one computer-generated asset can include generating, based on a single user input, representations of a group of instances of the at least one computer-generated asset; and projecting the processed representations of the one or more instances of the at least one computer-generated asset onto the animation scene can include displaying, based on the representations of a group of instances of the at least one computer-generated asset, the group of instances of the at least one computer-generated asset in the animation scene.

In some embodiments, processing representations of one or more instances of the at least one computer-generated asset can include manipulating representations of the one or more instances of the at least one computer-generated asset in accordance with at least one attribute.

In some embodiments, manipulating representations of the one or more instances of the at least one computer-generated asset comprises at least one of: designating representations of a percentage of the one or more instances of the at least one computer-generated asset for manipulating; and designating representations of one or more pre-determined instances of the at least one computer-generated asset for manipulating.

In some embodiments, manipulating representations of the one or more instances of the at least one computer-generated asset can include designating, based on the user input, one or more representations of the one or more instances of the at least one computer-generated asset for erasing; and projecting the processed representations of the one or more instances of the at least one computer-generated asset onto the animation scene can include erasing, from displaying, the one or more instances associated with the one or more representations designated for erasing.

In some embodiments, manipulating representations of the one or more instances of the at least one computer-generated asset can include designating one or more representations of the one or more instances of the at least one computer-generated asset for scaling, and determining representations of post-scaling instances of the at least one computer-generated asset. In some embodiments, projecting the processed representations of the one or more instances of the at least one computer-generated asset onto the animation scene can include displaying scaled one or more instances based on the representations of post-scaling instances, wherein the scaling increases or decreases dimensions of the one or more instances.

In some embodiments, manipulating representations of the one or more instances of the at least one computer-generated asset can include designating one or more representations of the one or more instances of the at least one computer-generated asset for paint-stroke based modification, and determining representations of post-modification instances. In some embodiments, projecting the processed representations of the one or more instances of the at least one computer-generated asset onto the animation scene comprises performing, based on the representations of the post-modification instances, at least one of: replacing one or more existing instances of one computer-generated asset with one or more instances of another computer-generated asset; changing at least one attribute of at least one instance of the at least one computer-generated asset; and re-randomizing the one or more instances to obtain a distribution of the instances.

In some embodiments, manipulating representations of the one or more instances of the at least one computer-generated asset can include designating one or more representations of the one or more instances of the at least one computer-generated asset for color-blending, and determining representations of post-color-blending instances. In some embodiments, projecting the processed representations of the one or more instances of the at least one computer-generated asset onto the animation scene can include displaying, based on the representations of the post-color-blending instances, the color-blended one or more instances. The color-blending can include blending the color of a first layer and the color of a second layer of the one or more instances.

In some embodiments, manipulating representations of the one or more instances of the at least one computer-generated asset can include generating a representation of an attraction sphere having an attraction radius; and projecting the processed representations of the one or more instances of the at least one computer-generated asset onto the animation scene can include providing the attraction sphere based on the representation of the attraction sphere. The attraction sphere can enable an animation of attracting one or more instances of at least one computer-generated asset positioned within a radius of the attraction sphere.

In some embodiments, manipulating representations of the one or more instances of the at least one computer-generated asset can include designating one or more representations of the one or more instances of the at least one computer-generated asset for combing, and determining representations of post-combing instances. In some embodiments, projecting the processed representations of the one or more instances of the at least one computer-generated asset onto the animation scene can include displaying, based on the one or more representations of post-combing instances, a variation of the one or more instances toward a pre-determined direction of combing.

In some embodiments, receiving the user input can include receiving a user request to invoke an algorithm-based operation, wherein the algorithm-based operation is capable of being performed in accordance with a preconfigured algorithm in absence of a paint stroke.

In some embodiments, processing representations of one or more instances of the at least one computer-generated asset can include generating representations of an arbitrary number of instances of the at least one computer-generated asset; and projecting the processed representations of the one or more instances of the at least one computer-generated asset onto the animation scene can include displaying, based on the representations of the arbitrary number of instances, the one or more instances randomly across a geometry in the animation scene.

In some embodiments, processing representations of one or more instances of the at least one computer-generated asset can include manipulating representations of one or more instances using a modification algorithm; and projecting the processed representations of the one or more instances of the at least one computer-generated asset onto the animation scene can include displaying, based on the manipulated representations, one or more modified instances. The modification algorithm can include at least one of: global scaling of the one or more instances, scaling variation for each of the one or more instances, initial orientation of the one or more instances, algorithm-based color blending of the one or more instances, separating of adjacent instances, and hue-saturation-value (HSV) variation for each of the one or more instances.

In some embodiments, processing representations of one or more instances of the at least one computer-generated asset can include manipulating representations of one or more instances for culling of the one or more instances. The culling is based on at least one of: camera view, slope, position, noise, pattern, textual map, ambient occlusion, and overlapping. Projecting the processed representations of the one or more instances of the at least one computer-generated asset onto the animation scene can include segregating the instances (e.g., erasing or removing instances that are outside of a camera frustum) and/or varying one or more attributes (e.g., instances "falling off" a underlying rock surface) of the one or more existing instances based on the culling operation.

In some embodiments, receiving the user input can include receiving a user request to directly manipulate the one or more instances of the at least one computer-generated asset in absence of a paint stroke or an algorithm.

In some embodiments, processing representations of one or more instances of the at least one computer-generated asset can include generating primitive data based on the representations of the one or more instances. The primitive data represents geometry of the one or more instances. In some embodiments, projecting the processed representations of the one or more instances of the at least one computer-generated asset onto the animation scene can include displaying the one or more instances using the corresponding primitive data.

In some embodiments, process 1400 can further include receiving, directly from the user, manipulation of the displayed one or more instances; and generating representations of the one or more manipulated instances.

In some embodiments, receiving the user input can include receiving a request to animate one or more instances of the at least one computer-generated asset.

In some embodiments, processing representations of one or more instances of the at least one computer-generated asset can include associating a variation of attributes with the representations of one or more instances; and projecting the processed representations of the one or more instances of the at least one computer-generated asset onto the animation scene can include displaying the one or more instances of the at least one computer-generated asset in accordance with the attribute variation.

In some embodiments, receiving the user input can include receiving a request to partition a plurality of existing instances of the at least one computer-generated asset.

In some embodiments, determining the type of operation and at least one attribute can include determining at least one of a type of partition and one or more attributes associated with the partition based on the user input. In some embodiments, processing representations of the plurality of existing instances of the at least one computer-generated asset can include identifying, in accordance with the determination of at least one of a type of partition and one or more attributes associated with the partition, representations of a first group of the existing instances and representations of a second group of the existing instances. In some embodiments, projecting the processed representations of the one or more instances of the at least one computer-generated asset onto the animation scene can include separately displaying, in accordance with the identification of the respective representations of the first group and second group, the first group of existing instances and the second group of existing instances.

In some embodiments, the type of partition comprises one or more of partition-by-asset, partition-by-selection, partition-by-color, or partition-by-size.

In some embodiments, process 1400 can further include constraining the one or more instances in the animation scene in place with respect to an associated geometry; and determining whether the geometry associated with the one or more constrained instances is modified. In accordance with the determination that the geometry is modified, process 1400 can further include re-projecting, using the metadata, the processed representations of the one or more instances of the at least one computer-generated asset onto the modified geometry in the animation scene.

In some embodiments, process 1400 can further include obtaining a plurality of polygon models for each of the at least one computer-generated asset, wherein the plurality of polygon models comprise models having different number of polygons.

In some embodiments, projecting the processed representations of the one or more instances of the at least one computer-generated asset onto the animation scene can include projecting the processed representations using one or more of the plurality of polygon models.

Figure 15:
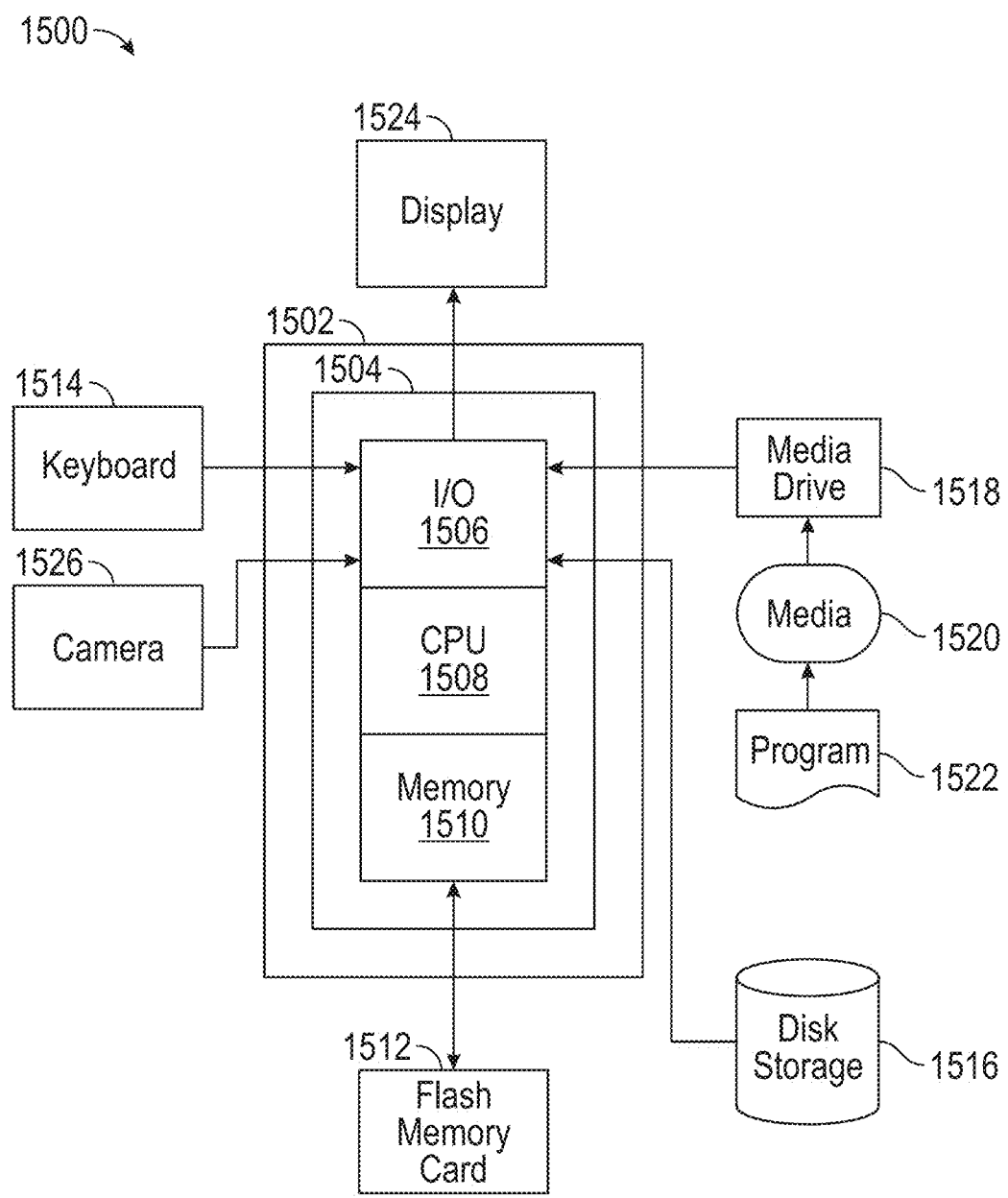
FIG. 15 depicts an exemplary computing system in accordance with some embodiments.

FIG. 15 depicts components of an exemplary computing system 1500 configured to perform any one of the above-described processes. In some embodiments, computing system 1500 is a desktop computer, tablet computer, smartphone, server, media player (e.g., DVD player), video game console, or the like. Computing system 1500 may include, for example, a processing unit including one or more processors, a memory, a storage, and input/output devices (e.g., monitor, touch screen, keyboard, camera, stylus, drawing device, disk drive, USB, Internet connection, near-field wireless communication, Bluetooth, etc.). However, computing system 1500 may include circuitry or other specialized hardware for carrying out some or all aspects of the processes (e.g., process 1400). In some operational settings, computing system 1500 may be configured as a system that includes one or more units, each of which is configured to carry out some aspects of the processes in software, hardware, firmware, or some combination thereof.

In computing system 1500, the main system 1502 may include a motherboard 1504 with a bus that connects an input/output ("I/O") section 1506, one or more central processing unit ("CPU") 1508, and a memory section 1510, which may have a flash memory card 1512 related to it. Memory section 1510 may contain computer-executable instructions and/or data for carrying out at least portions of process 1400. The I/O section 1506 is optionally connected to display 1524, a camera 1526, a keyboard 1514, a disk storage unit 1516, or a media drive unit 1518. The media drive unit 1518 can read/write to non-transitory, computer-readable storage medium 1520, which can contain programs 1522 and/or data.

At least some values based on the results of the above-described processes can be saved for subsequent use. Additionally, a non-transitory, computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A computer implemented method of composing an animation scene in a computer-generated animation, the method comprising:

receiving a user input requesting to perform an operation on at least one computer-generated asset in the animation scene;
determining, based on the user input, a type of the operation;
in accordance with the determination of the type of the operation:
processing representations of one or more instances of the at least one computer-generated asset;
projecting the processed representations of the one or more instances of the at least one computer-generated asset onto the animation scene to perform the operation; and
generating metadata associated with the representations of the one or more instances that includes positions of the one or more instances within the animation scene before and after performing the operation, wherein the metadata enables re-projecting of the processed representations of the one or more instances of the at least one computer-generated asset.

2. The method of claim 1, further comprising:
determining based on the user input at least one attribute associated with the at least one computer-generated asset in the animation scene, wherein the processing of the one or more instances of the at least one computer generated asset is performed in accordance with the determination of the at least one attribute.

3. The method of claim 2, wherein the type of the operation comprises one or more of a paint-stroke based operation, an algorithm-based operation, a direct manipulating operation, an animation operation, or a partitioning operation; and wherein the at least one attribute comprising one or more of position, radius, color, density, opacity, strength, texture, ramp, and linearity associated with the at least one computer-generated asset in the animation scene, and a type of partition.

4. The method of claim 2, wherein the metadata further comprises a time stamp of the operation.

5. The method of claim 4, wherein processing representations of one or more instances of the at least one computer-generated asset comprises manipulating representations of the one or more instances of the at least one computer-generated asset in accordance with at least one attribute.

6. The method of claim 5, wherein manipulating representations of the one or more instances of the at least one computer-generated asset comprises at least one of:
designating representations of a percentage of the one or more instances of the at least one computer-generated asset for manipulating; or
designating representations of one or more pre-determined instances of the at least one computer-generated asset for manipulating.

7. The method of claim 5, wherein manipulating representations of the one or more instances of the at least one computer-generated asset comprises designating, based on the user input, one or more representations of the one or more instances of the at least one computer-generated asset for erasing; and
wherein projecting the processed representations of the one or more instances of the at least one computer-generated asset onto the animation scene comprises erasing, from displaying, the one or more instances associated with the one or more representations designated for erasing.

8. The method of claim 5, wherein manipulating representations of the one or more instances of the at least one computer-generated asset comprises:
designating one or more representations of the one or more instances of the at least one computer-generated asset for scaling; and
determining representations of post-scaling instances of the at least one computer-generated asset; and
wherein projecting the processed representations of the one or more instances of the at least one computer-generated asset onto the animation scene comprises displaying scaled one or more instances based on the representations of post-scaling instances, wherein the scaling increases or decreases dimensions of the one or more instances.

9. The method of claim 5, wherein manipulating representations of the one or more instances of the at least one computer-generated asset comprises:
designating one or more representations of the one or more instances of the at least one computer-generated asset for paint-stroke based modification; and
determining representations of post-modification instances; and
wherein projecting the processed representations of the one or more instances of the at least one computer-generated asset onto the animation scene comprises performing, based on the representations of the post-modification instances, at least one of:
replacing one or more existing instances of one computer-generated asset with one or more instances of another computer-generated asset;
changing at least one attribute of at least one instance of the at least one computer-generated asset; or
re-randomizing the one or more instances to obtain a distribution of the instances.

10. The method of claim 5, wherein manipulating representations of the one or more instances of the at least one computer-generated asset comprises:
designating one or more representations of the one or more instances of the at least one computer-generated asset for color blending; and
determining representations of post-color-blending instances; and
wherein projecting the processed representations of the one or more instances of the at least one computer-generated asset onto the animation scene comprises displaying, based on the representations of the post-color-blending instances, the color-blended one or more instances, wherein the color-blending comprises blending the color of a first layer and the color of a second layer of the one or more instances.

11. The method of claim 5, wherein manipulating representations of the one or more instances of the at least one computer-generated asset comprises generating a representation of an attraction sphere having an attraction radius; and
wherein projecting the processed representations of the one or more instances of the at least one computer-generated asset onto the animation scene comprises providing the attraction sphere based on the representation of the attraction sphere, the attraction sphere enabling an animation of attracting one or more instances of at least one computer-generated asset positioned within a radius of the attraction sphere.

12. The method of claim 1, wherein processing representations of one or more instances of the at least one computer-generated asset comprises generating representations of an arbitrary number of instances of the at least one computer-generated asset; and
wherein projecting the processed representations of the one or more instances of the at least one computer-generated asset onto the animation scene comprises displaying, based on the representations of the arbitrary number of instances, the one or more instances randomly across a geometry in the animation scene.

13. The method of claim 1, wherein receiving the user input comprises receiving a user request to directly manipulate the geometry of one or more instances visualized in the animation scene.

14. The method of claim 13, wherein processing representations of one or more instances of the at least one computer-generated asset comprises generating primitive data based on the representations of the one or more instances, the primitive data representing geometry of the one or more instances; and
wherein projecting the processed representations of the one or more instances of the at least one computer-generated asset onto the animation scene comprises displaying the geometry of one or more instances using the corresponding primitive data.

15. The method of claim 1, wherein receiving the user input comprises receiving a request to animate one or more instances of the at least one computer-generated asset.

16. The method of claim 1, wherein receiving the user input comprises receiving a request to partition a plurality of existing instances of the at least one computer-generated asset.

17. The method of claim 1, further comprising:
constraining the one or more instances in the animation scene in place with respect to an associated geometry;
determining whether the geometry associated with the one or more constrained instances is modified; and
in accordance with the determination that the geometry is modified, re-projecting, using the metadata, the processed representations of the one or more instances of the at least one computer-generated asset onto the modified geometry in the animation scene.

18. The method of claim 1, further comprising obtaining a plurality of polygon models for each of the at least one computer-generated asset, wherein the plurality of polygon models comprise models having different numbers of polygons, wherein projecting the processed representations of the one or more instances of the at least one computer-generated asset onto the animation scene comprises projecting the processed representations using one or more of the plurality of polygon models.

19. A system for composing an animation scene in a computer-generated animation, the system comprising:
a processing unit and memory, wherein the processing unit is configured to:
receive a user input requesting to perform an operation on at least one computer-generated asset in the animation scene;
determine, based on the user input, a type of the operation;
in accordance with the determination of the type of the operation:
process representations of one or more instances of the at least one computer-generated asset;
project the processed representations of the one or more instances of the at least one computer-generated asset onto the animation scene to perform the operation; and
generating metadata associated with the representations of the one or more instances that includes positions of the one or more instances within the animation scene before and after performing the operation, wherein the metadata enables re-projecting of the processed representations of the one or more instances of the at least one computer-generated asset.

20. The system of claim 19, wherein the processor is further configured to:
determine based on the user input at least one attribute associated with the at least one computer-generated asset in the animation scene, wherein the processing of the one or more instances of the at least one computer generated asset is performed in accordance with the determination of the at least one attribute.

21. The system of claim 19, wherein the user input comprises a user request to directly manipulate the geometry of one or more instances visualized in the animation scene.

22. A non-transitory computer-readable storage medium comprising computer-executable instructions for composing an animation scene in a computer-generated animation, the computer-executable instructions comprising instructions for:
receiving a user input requesting to perform an operation on at least one computer-generated asset in the animation scene;
determining, based on the user input, a type of the operation;
in accordance with the determination of the type of the operation:
processing representations of one or more instances of the at least one computer-generated asset;
projecting the processed representations of the one or more instances of the at least one computer-generated asset onto the animation scene to perform the operation; and
generating metadata associated with the representations of the one or more instances that includes positions of the one or more instances within the animation scene before and after performing the operation, wherein the metadata enables re-projecting of the processed representations of the one or more instances of the at least one computer-generated asset.

23. The non-transitory computer-readable storage medium of claim 22, wherein the computer-executable instructions comprise further instructions for:
determining based on the user input at least one attribute associated with the at least one computer-generated asset in the animation scene, wherein the processing of the one or more instances of the at least one computer generated asset is performed in accordance with the determination of the at least one attribute.

24. The non-transitory computer-readable storage medium of claim 22, wherein receiving the user input comprises receiving a request to animate one or more instances of the at least one computer-generated asset.

* * * * *